US 12,256,316 B2

(12) United States Patent
Sha et al.

(10) Patent No.: US 12,256,316 B2
(45) Date of Patent: Mar. 18, 2025

(54) PRECONFIGURING DEDICATED RESOURCE INFORMATION IN IDLE MODE

(71) Applicant: ZTE Corporation, Guangdong (CN)

(72) Inventors: Xiubin Sha, Guangdong (CN); Bo Dai, Guangdong (CN); Ting Lu, Guangdong (CN); Xu Liu, Guangdong (CN); Kun Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 398 days.

(21) Appl. No.: 17/371,726

(22) Filed: Jul. 9, 2021

(65) Prior Publication Data
US 2021/0400567 A1    Dec. 23, 2021

Related U.S. Application Data

(63) Continuation of application No. PCT/CN2019/071449, filed on Jan. 11, 2019.

(51) Int. Cl.
*H04W 48/14*    (2009.01)
*H04W 48/16*    (2009.01)
(Continued)

(52) U.S. Cl.
CPC .......... *H04W 48/14* (2013.01); *H04W 48/16* (2013.01); *H04W 56/001* (2013.01); *H04W 76/27* (2018.02)

(58) Field of Classification Search
CPC ....... H04L 5/001; H04L 5/003; H04L 5/0094; H04W 48/14; H04W 48/16; H04W 56/001; H04W 76/27; H04W 72/21; H04W 76/30
See application file for complete search history.

(56) References Cited

U.S. PATENT DOCUMENTS

2002/0075844 A1* 6/2002 Hagen ................ H04L 63/0442
370/328
2011/0141928 A1* 6/2011 Shin .................... H04L 1/0028
370/252
(Continued)

FOREIGN PATENT DOCUMENTS

CN    103957603 A    7/2014

OTHER PUBLICATIONS

IPOS, Written Opinion for Singaporean Application No. 11202107611Q, mailed on Jan. 12, 2023, 7 pages.
(Continued)

*Primary Examiner* — Stephen J Clawson
(74) *Attorney, Agent, or Firm* — Perkins Coie LLP

(57) ABSTRACT

Methods, systems, and devices related to related to digital wireless communication, and more specifically, to techniques related to pre-configure dedicated resources for data transmission. In one exemplary aspect, a method for wireless communication includes receiving a pre-configured transmission resource request from a terminal. The method also includes configuring a pre-configured transmission resource based on the pre-configured transmission resource request. In another exemplary embodiment, a method for wireless communication includes receiving a pre-configured transmission resource request from a terminal, wherein the pre-configured transmission resource request includes a medium access control (MAC) control element. The method also includes configuring a pre-configured transmission resource based on the pre-configured transmission resource request.

16 Claims, 18 Drawing Sheets

(51) Int. Cl.
  *H04W 56/00* (2009.01)
  *H04W 76/27* (2018.01)

(56) References Cited

U.S. PATENT DOCUMENTS

| | | | | |
|---|---|---|---|---|
| 2012/0033613 | A1 | 2/2012 | Lin et al. | |
| 2013/0265866 | A1* | 10/2013 | Yi | H04W 74/006 370/216 |
| 2013/0301541 | A1* | 11/2013 | Mukherjee | H04W 74/0833 370/329 |
| 2020/0107396 | A1* | 4/2020 | Wang | H04W 72/23 |
| 2020/0170069 | A1* | 5/2020 | Shih | H04W 76/19 |
| 2020/0196264 | A1* | 6/2020 | Shih | H04W 74/0833 |
| 2020/0260397 | A1* | 8/2020 | Vos | H04W 74/0833 |
| 2020/0322981 | A1* | 10/2020 | Choe | H04L 5/0094 |
| 2021/0136860 | A1* | 5/2021 | Phuyal | H04W 56/001 |
| 2021/0168895 | A1* | 6/2021 | Sha | H04W 76/27 |
| 2021/0235407 | A1* | 7/2021 | Zhang | H04W 74/0833 |
| 2021/0274526 | A1* | 9/2021 | Shin | H04L 5/0094 |
| 2021/0298108 | A1* | 9/2021 | Wu | H04W 56/0045 |
| 2021/0306968 | A1* | 9/2021 | Liberg | H04B 17/318 |
| 2021/0400567 | A1* | 12/2021 | Sha | H04W 72/21 |
| 2021/0410166 | A1* | 12/2021 | Shrestha | H04W 72/1268 |
| 2021/0410180 | A1* | 12/2021 | Tsai | H04W 72/1263 |
| 2022/0007392 | A1* | 1/2022 | Chang | H04W 52/0219 |
| 2022/0039098 | A1* | 2/2022 | Chang | H04W 76/20 |
| 2022/0078739 | A1* | 3/2022 | Zhang | H04W 56/0045 |
| 2022/0094508 | A1* | 3/2022 | Keating | H04L 5/0048 |
| 2022/0191969 | A1* | 6/2022 | Zheng | H04W 72/115 |
| 2022/0225252 | A1* | 7/2022 | Kiilerich Pratas | H04W 56/0045 |
| 2022/0225257 | A1* | 7/2022 | Laselva | H04W 24/10 |
| 2022/0225258 | A1* | 7/2022 | Ratasuk | H04W 56/0045 |

OTHER PUBLICATIONS

CIPO, Office Action for Canadian Application No. 3,126,402, mailed on Jan. 19, 2023, 5 pages.
CNIPA, Notification to Complete Formalities of Registration for Chinese Application No. 202210184342.8, mailed on Feb. 17, 2023, 4 pages.
KIPO, Office Action for Korean Application No. 10-2021-7025360, mailed on May 26, 2023, 7 pages with unofficial translation.
Nokia et al., "Transmission in preconfigured UL resources," 3GPP TSG RAN WG1 #95, Spokane, USA, R1-1812904, Nov. 12-16, 2018, 5 pages.
European Search Report for EP Patent Application No. 19850591.9, dated Jun. 23, 2022, 11 pages.
Huawei et al., "UL transmission in preconfigured resource," 3GPP TSG RAN WG1 Meeting #94bis, R1-1810089, Chengdu, Oct. 8-12, 2018, 6 pages.
Huawei et al., "Feature lead summary of Support for transmission in preconfigured UL resources," 3GPP TSG RAN WG1 Meeting #95, R1-1813717, Spokane, USA, Nov. 12-16, 2018, 20 pages.
Indonesian IP Office, Office Action for Indonesian Application No. P00202106261, mailed on Oct. 2, 2023, 5 pages with unofficial translation.
KIPO, Notice of Final Rejection for Korean Application No. 10-2021-7025360, mailed on Nov. 13, 2023, 6 pages with unofficial translation.
Sierra Wireless, "Pre-configured UL Resources Design Considerations," 3GPP TSG RAN WG2 Meeting#104, Spokane, U.S.A., R2-1817940, 9 pages, Nov. 12-16, 2018.
International Search Report and Written Opinion mailed on Sep. 25, 2019 for International Application No. PCT/CN2019/071449, filed on Jan. 11, 2019 (7 pages).
ZTE, "Support for transmission in preconfigured UL resources for NB-IoT," 3GPP TSG RAN WG1 Meeting#95, Spokane, U.S.A., R1-1812774, 7 pages, Nov. 12-16, 2018.
CIPO, Office Action for Canadian Application No. 3,126,402, mailed on Jan. 3, 2024, 12 pages.
EPO, Communication pursuant to Article 94(3) EPC for European Application No. 19850591.9, mailed on Feb. 19, 2024, 7 pages.
KIPO, Notice of Final Rejection for Korean Application No. 10-2021-7025360, mailed on Mar. 27, 2024, 7 pages with English translation.
Sierra Wireless, "LTE-M Pre-configured UL Resources Design Considerations," 3GPP TSG RAN WG1 #95, Spokane, USA, R1-1812724, Nov. 12-16, 2018, 11 pages.
IPOS, Written Opinion for Singapore Application No. 11202107611Q, mailed on Jul. 4, 2024, 8 pages.
KIPO, Office Action for Korean Application No. 10-2024-7021613, mailed on Aug. 12, 2024, 5 pages with English summary.
KIPO, IPTAB Decision for Korean Application No. 10-2021-7025360, mailed on Aug. 20, 2024, 16 pages with English summary.
CNIPA, Office Action for Canadian Application No. 3,126,402, mailed on Nov. 18, 2024, 5 pages.

* cited by examiner

| R | CONFIG INDEX | OCT 1 |

FIG. 3F

| R | DATA VOLUME | OCT 1 |
| INTERVAL UNIT | INTERVAL LENGTH | OCT 2 |

FIG. 3G

| R | CONFIG INDEX | OCT 1 |
| R | DATA VOLUME | OCT 2 |
| INTERVAL UNIT | INTERVAL LENGTH | OCT 3 |
| R | WEEKOFDAY | OCT 4 |
| OFFSET UNIT | PUR START TIME OFFSET | OCT 5 |

FIG. 3H

| R | DATA VOLUME | OCT 1 |
| INTERVAL UNIT | INTERVAL LENGTH | OCT 2 |
| PUR START TIME | | OCT 3 |
| PUR START TIME | | OCT 4 |
| PUR START TIME | | OCT 5 |
| PUR START TIME | | OCT 6 |
| PUR START TIME | | OCT 7 |
| PUR START TIME | | OCT 8 |

FIG. 3I

| R | F2 | E | LCID | OCT 1 |
|---|----|---|------|-------|
| R | R  | eLCID | | OCT 2 |

FIG. 3J

| R | F2 | E | LCID | OCT 1 |
|---|----|---|------|-------|
| R | R  | eLCID | | OCT 2 |
| F | L  | | | OCT 3 |

FIG. 3K

| R | F2 | E | LCID | OCT 1
| R | R | eLCID | | OCT 2

FIG. 4E

| R | F2 | E | LCID | OCT 1
| R | R | eLCID | | OCT 2
| F | L | | | OCT 3

FIG. 4F

PRECONFIGURING DEDICATED RESOURCE INFORMATION IN IDLE MODE

CROSS-REFERENCE TO RELATED APPLICATIONS

This application is a continuation of International Patent Application No. PCT/CN2019/071449, filed on Jan. 11, 2019, the contents of which are incorporated herein by reference in their entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to pre-configuring dedicated resource information.

In one exemplary aspect, a method for wireless communication includes receiving a pre-configured transmission resource request from a terminal. The method also includes configuring a pre-configured transmission resource based on the pre-configured transmission resource request.

In another exemplary embodiment, a method for wireless communication includes receiving a pre-configured transmission resource request from a terminal, wherein the pre-configured transmission resource request includes a medium access control (MAC) control element. The method also includes configuring a pre-configured transmission resource based on the pre-configured transmission resource request.

In another exemplary embodiment, a method for wireless communication includes receiving a pre-configured transmission resource release request from a terminal, wherein the pre-configured transmission resource release request includes an MAC control element. The method also includes releasing a pre-configured transmission resource based on the pre-configured transmission resource release request.

In another exemplary embodiment, a method for wireless communication includes receiving a message including a pre-configured transmission resource configuration from a communication node. The method also includes determining validity of a pre-configured transmission resource associated with the pre-configured transmission resource configuration based on a timing advance (TA) validity determination.

In another exemplary embodiment, a method for wireless communication includes receiving a message including a pre-configured transmission resource configuration and a pre-configured transmission resource release instance from a communication node. The method also includes determining a comparison between a duration of continuous inactivity of a pre-configured transmission resource associated with the pre-configured transmission resource configuration and the pre-configured transmission resource release instance.

In another exemplary embodiment, a method for wireless communication includes transmitting a pre-configured transmission resource to a terminal. The method also includes receiving a failure message over the pre-configured transmission resource indicating an invalid timing advance (TA) or a failed uplink transmission. The method also includes transmitting a control channel order including a random-access resource over a terminal-specific pre-configured transmission resource search space to the terminal. The method also includes receiving a terminal identified preamble on the random-access resource. The method also includes transmitting a pre-configured transmission resource control channel scheduling message on the terminal-specific pre-configured transmission resource search space, wherein the pre-configured transmission resource control channel scheduling message includes a TA update information or a grant for a TA update.

In another exemplary embodiment, a method for wireless communication includes receiving a pre-configured transmission resource associated with a pre-configured transmission resource configuration. The method also includes transmitting uplink information based on the pre-configured transmission resource to a communication node, wherein the uplink information includes a resource control state transition information.

In another exemplary embodiment, a method for wireless communication includes receiving a pre-configured transmission resource from a first communication node. The method also includes reselecting a second communication node based a terminal mobility of the terminal. The method also includes transmitting a pre-configured transmission resource release request to the second communication node, wherein the pre-configured transmission resource release request includes a communication node identifier identifying the first communication node and a terminal identifier identifying the terminal.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below. Other features will be apparent from the description and drawings, and from the claims.

BRIEF DESCRIPTION OF THE DRAWINGS

FIGS. 3A-3K illustrate examples of MAC CE for reporting and updating requests in a service mode.

FIGS. 4A-4F illustrate examples of MAC CE for a PUR resource release request.

DETAILED DESCRIPTION

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

Figure 1:
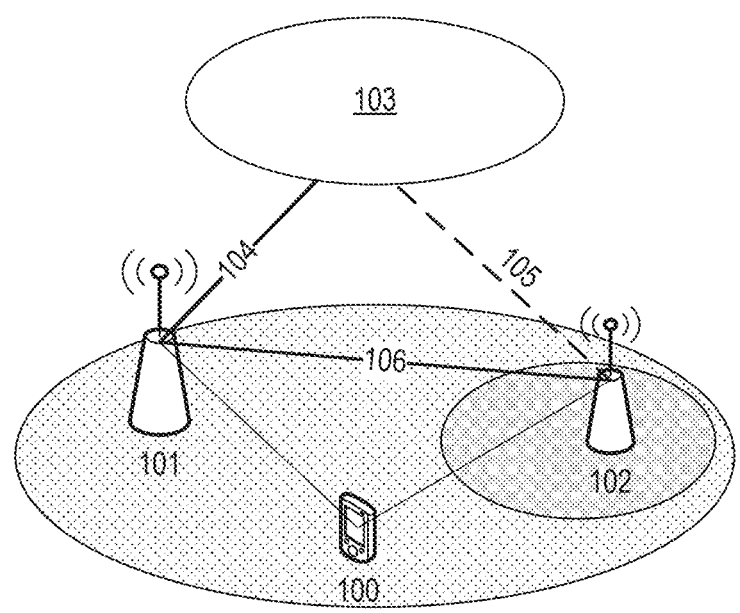
FIG. 1 shows an exemplary schematic diagram of a system architecture for Dual Connectivity (DC).

As NR emerges in the wireless domain, UEs will be capable of supporting both protocols at the same time. FIG. 1 shows an exemplary schematic diagram of a system architecture for Dual Connectivity (DC). The current base station (referred to as the first network element 101) in the core network 103 may select a suitable base station for the UE 100 to function as the second network element 102. For example, the suitable based station can be selected by comparing the channel quality of the base station with a predetermined threshold. Both base stations can provide radio resources to the UE 100 for data transmission on the user plane. On the wired interface side, the first network element 101 and the core network 103 establish a control plane interface 104 for the UE 100. The second network element 102 and the core network 103 may establish a user plane interface 105 for the UE 100. An interface 106 (e.g., Xn interface) inter-connects the two network elements. On the wireless interface side, the first and the second network elements (101 and 102) may provide radio resources using the same or different Radio Access Technologies (RATs). Each of the network element can schedule transmissions with the UE 100 independently. The network element that has a control plane connection to the core network is referred to as the master node (e.g., the first network element 101), and the network element that has only a user plane connection with the core network is referred to as the secondary node (e.g., the second network element 102). In some cases, the UE 100 can be connected to more than two nodes, with one node acting as the primary note and the remaining acting as the secondary nodes.

In some embodiments, a UE can support a LTE-NR dual connection (DC). For example, one of the typical LTE-NR dual connectivity architectures can be set up as follows: the master node is an LTE RAN node (e.g., eNB) and the secondary node is an NR RAN node (e.g., gNB). The eNB and the gNB are simultaneously connected the Evolved Packet Core (EPC) network (e.g., LTE core network). The architecture shown in FIG. 1 can also be modified to include various master/secondary node configurations. For example, a NR RAN node can be the master node and the LTE RAN node can be the secondary node. In such case, the core network for the master NR RAN node is a Next Generation Converged Network (NG-CN).

UE capabilities for the LTE protocol and the NR protocol in LTE-NR DC include two parts: common capabilities of the UE that are applicable to both LTE and NR protocols for single connectivity scenarios, and band combination capabilities of the UE that are relevant for dual connectivity scenarios. When the UE has multiple simultaneous connections with network nodes, the frequency bands used for different network nodes must cooperate with each other regardless of the RAT type(s) used. Here, the term "cooperate" means that the UE can operate in the frequency bands without any conflicts or substantial interference—that is, the frequency bands can co-exist. For example, the 3rd Generation Partnership Project (3GPP) Standards specify a set of band combinations that can cooperate with each other. If frequency band 1 and frequency band 2 are not specified as a valid band combination, the UE cannot use frequency band 1 in communication with node 1 and frequency band 2 in communication with node 2 and the same time.

This patent document describes techniques that can be implemented to pre-configure dedicated resources in idle mode for data transmission.

In machine to machine (M2M) communication systems, a terminal (or "User Equipment (UE)") energy power may be consumed during an establishment of a radio resource control (RRC) connection process and data transmission and reception in a RRC connected state. For a NarrowB and-Internet of Things (NB-IoT) small main bearing for data transmission, a terminal may be in an RRC connected state for a short time, and the primary power consumption of the terminal may be during a connection establishment procedure (e.g., a physical random-access channel (PRACH) procedure). Particularly, in an early data transmission (EDT), small data packets may be transmitted by the PRACH procedure, and a terminal transmitting small data packets may not have to enter an RRC connected state. Accordingly, in some events, power consumption of a terminal transmitting small data packets may primarily be consumed during the PRACH procedure.

In many cases, a PRACH process in a RRC connection establishment process may be based on PRACH resources, where the process may be divided into four steps. A first step may include a first message from a terminal ("UE") to a base station or communication node (or "eNodeB"), which may be represented by: Msg1: UE->eNodeB. A second step may include a random-access response (RAR) message from the base station to the terminal, which may be represented by: Msg2: eNodeB->UE. A third step may include a first RRC message from the terminal to the base station, which may be represented by: Msg3: UE->eNodeB. A fourth step may include a second RRC message from the base station to the terminal, which may be represented by: Msg4: eNodeB->UE.

The third step (Msg3) may include a UE identifier that identifies a terminal, and the fourth step (Msg4) may complete a contention resolution based on the UE identifier, and the PRACH process may end. In a non-EDT scheme, after the contention resolution is complete, the terminal may enter a RRC connected state and start a terminal-specific data transmission. In an EDT scheme, the third step (msg3) may carry/include uplink data, and the fourth step (Msg4) may include the downlink data. A description of contention completion may indicate that the uplink and/or downlink data has been successfully transmitted to a destination. Upon this completion, the terminal may transition into a RRC idle state.

If a terminal is configured with a dedicated uplink resource in an RRC idle mode, such as a pre-configured uplink resource (PUR), the data transmission/reception may be performed on the PUR, and contention resolution (UE identification) may be completed based on a pre-configured resource transmitted in the second step (Msg2). This may shorten the PRACH process and improve efficiency (including energy efficiency) of small data transmission.

When pre-configuring an RRC idle mode dedicated resources for a terminal, the following issues may be considered: strategy considerations for downlink data transmission based on pre-configured dedicated resources, a PUR PDCCH common search space (CSS) configuration method; a PUR UE-specific PDCCH search space (PUR-USS) configuration method, coupling processing method for paging and pre-configured dedicated resources, and PUR dedicated resource configuration method with multi-service pattern overlay.

Example Embodiment 1

Figure 2:
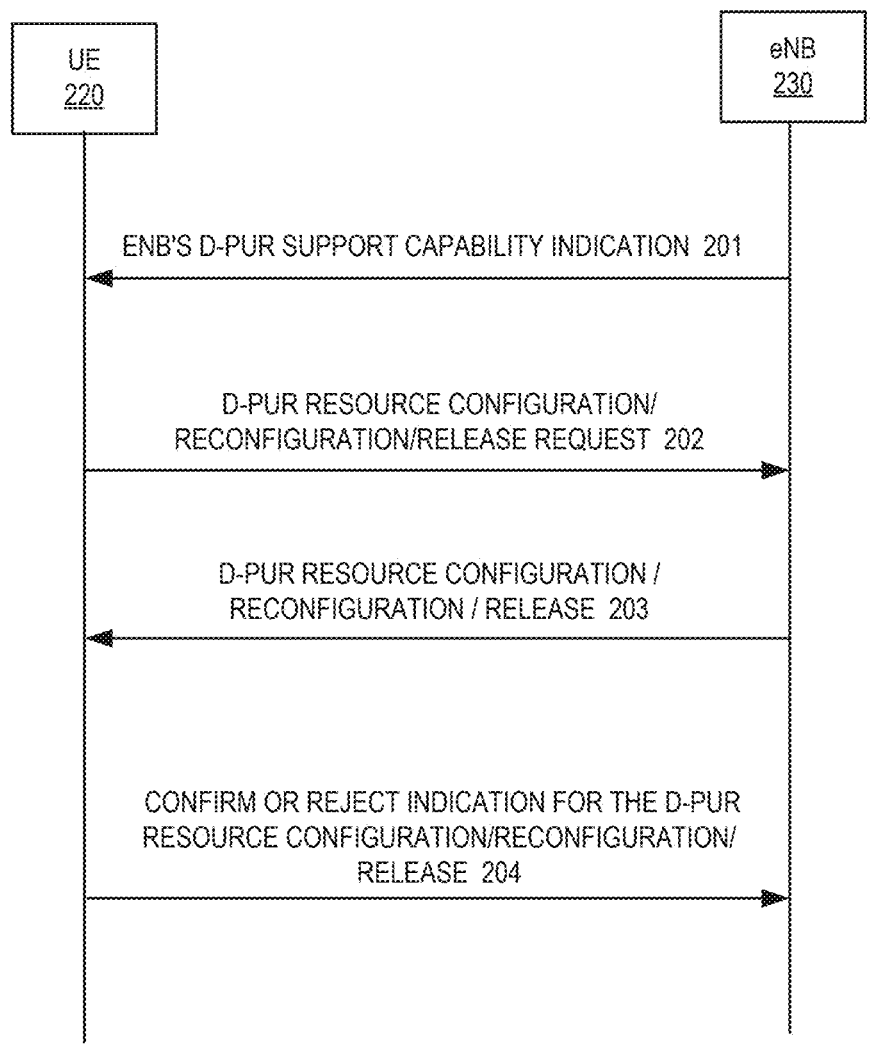
FIG. 2 illustrates a flow process of configuring an idle mode dedicated resource by a communication node based on a service mode reported by a terminal.

FIG. 2 illustrates a flow process of configuring an idle mode dedicated resource by a communication node based on a service pattern reported by a terminal. In Step 201, a communication node (or "eNodeB (eNB)") 230 may transmit a eNB dedicated preconfigured transmission resource (or "dedicated preconfigured uplink resource (D-PUR)") to a terminal (or user equipment (UE)") 220. The support capability indication 201 may be carried by a system information block (SIB) or a downlink UE-specific message. If the D-PUR resource configuration request (e.g., 202) is reported in a RRC MSG3, the D-PUR capacity of the eNB 230 may be carried in the SIB. If the D-PUR resource configuration request is reported in a RRC MSG5 or a subsequent message, the D-PUR capability is carried in SIB or in the down link UE-specific message bearer (e.g., a RRC MSG4 or a subsequent downlink message bearer) in the SIB.

Step 202: The terminal 220 may transmit a D-PUR resource configuration/reconfiguration/release request to the eNB 230. This request 202 may include a PUR resource configuration request that includes information about at least one of the following service patterns relation to PUR transmission: a data volume, a data packet size to be transmitted, a data transmission interval, and/or a data transmission start time, a pre-configured transmission resource uplink (UL) grant information, a pre-configured transmission resource time interval, a pre-configured transmission resource start time of data transmission resources, a number of physical uplink shared channel (PUSCH) transmission repetitions carried on a pre-configured transmission resource, a number of physical downlink control channel (PDCCH) transmission repetitions corresponding a pre-configured transmission resource, a physical downlink control channel (PDCCH) search space, a data volume and power headroom report (DPR), an extended DPR (eDPR), a power headroom report (PHR) information, a terminal speed indication, and a terminal capability of supporting pre-configured transmission resource configuration in idle mode. Request 202 may include a PUR resource reconfiguration request that includes one or more PUR service pattern related information in the PUR resource configuration request. Request 202 may include a PUR resource release that includes at least the PUR resource release indication. The PUR resource request may be carried by an RRC message and/or a medium access control (MAC) control element (CE).

In some embodiments, the RRC message may include at least one of a RRC Msg3 (RRCConnectionRequest, RRCEarlyDataRequest, RRCConnectionResumeRequest, or RRCConnectionReestablishmentRequest), and a RRC Msg 5 (RRCConnectionSetupComplete, RRCConnectionResumeComplete, RRCConnectionReestablishmentComplete), or another newly introduced uplink RRC message.

In the request 202, before a PUR resource request, the eNB 230 may indicate whether the eNB 230 supports data transmission with pre-configured dedicated resource in idle mode based on the UE PUR resource request related information. If the PUR resource request is carried in the RRC Msg3 or the MAC CE, the indication may be broadcast through the SIB. If the PUR resource request is carried in the RRC Msg5 or the MAC CE, the indication may be carried by the SIB or RRC Msg4 (RRCConnectionSetup, RRCConnectionResume, RRCConnectionReestablishment). If the PUR resource request is carried in the newly defined RRC message, the indication may be carried by the SIB, the RRC Msg4 (RRCConnectionSetup, RRCConnectionResume, RRCConnectionReestablishment), the RRC Reconfiguration message (RRCConnection Reconfiguration), the DCI or the downlink MAC CE.

Step 203: The eNB 230 may transmit a D-PUR resource message to the UE 220. In an embodiment, the request 203 may include a PUR resource configuration, the configuration includes one of the following information related to the PUR: the PUR UL Grant, PUR resource interval, PUR resource time domain information (PUR resource data transmission start time or time offset), PUR resource service pattern (time domain bit sequence, multiple sets of service pattern configuration, Configuration index for multiple sets of service pattern configuration), the number of repetitions of the PUSCH transmission on the PUR, the PDCCH search space corresponding to PUR, the PDCCH search space monitoring duration information, PHR reporting request indication, DPR reporting request indication, eDPR reporting request indication, UE Movement speed indication and/or PUR Configurable indication.

The PUR resource may be reconfigured to reconfigure at least one piece of information in the PUR resource. The UE 220 may be instruction to report a simple PUR support capability rather than a PUR resource request 202.

In an embodiment, the message 203 may include a PUR resource release, indicating a release of PUR configured resources. The PUR resource configuration/reconfiguration/release can be performed by an RRC message and/or a MAC CE. The RRC message may include at least one of: RRC Msg4 (RRCConnection Setup, RRCEarlyData Complete, RRCConnectionResume, RRCConnectionReject, or RRCConnectionReestablishment), RRCConnectionReconfiguration, RRC Release (RRCConnection Release), or another newly introduced uplink RRC message. The PUR resource release may also be done by PDCCH DCI (either implicitly indicated by ack for PURTransmission or explicitly indicated by the indication field in the DCI).

The PUR resource configuration and the reconfiguration may be matched with the service pattern of the PUR resource request with a one-time PUR resource configuration (configured once), equal interval periodic resource configuration (interval for configuring PUR resources), and periods with unequal intervals resource allocation (such as PUR resources only take effect in the hours of the day, the days of the week, or the days of the month, etc., can be indicated by Bitmap, such as bitofDay BIT STRING (size (24))); bitofWeek BIT STRING(size(7)); bitofMonth BIT STRING(size(31)); BIT of 1 means that the PUR resource exists at the time indicated by the bit ; BIT of 0 means that the time indicated by the bit PUR resource is not Exist; or by a configuration set of a service pattern).

Step 204: the UE 220 may transmit a confirm or reject indication for the D-PUR resource configuration/reconfiguration/release to the eNB 230. A UE 220 in the PUR Resource location sending a PUSCH Channel, the channel may carry at least one of the following information: user data, NAS data, RRC Message, PHR MAC CE, Data volume and Power headroom report (DPR MAC CE, Extended DPR (eDPR) MAC CE, UE Movement speed indication, and PUR Configuration indication.

Example Embodiment 2

FIGS. 3A-K illustrate examples of MAC CE for reporting and updating requests in a service pattern. In a reporting service pattern, the MAC CE update request may include at least one of the following information: PUR UL Grant, data volume to be transmitted over PUR, PUR time domain information (PUR resource start time or time offset), PUR resource service pattern (time domain bit sequence, multiple sets of service pattern configuration, multiple sets of service pattern configuration index), PUSCH transmission repetition number carried on the PUR, PDCCH search space, a number of physical downlink control channel (PDCCH) transmission repetitions corresponding a pre-configured transmission resource, PDCCH search space monitoring Duration related information, PHR information, DPR information, eDPR information, UE movement speed indication, and/or PUR configurable indication.

The MAC CE may be defined as a plurality of independent MAC CE (respectively an LC-ID), or defined as a variable-length MAC CE (corresponding to an LC-ID. The domain may be characterized by the length of the MAC CE, where different lengths may contain different service pattern information; and different information of the same length may be identified by the bit value in the MAC CE).

Figure 3A:
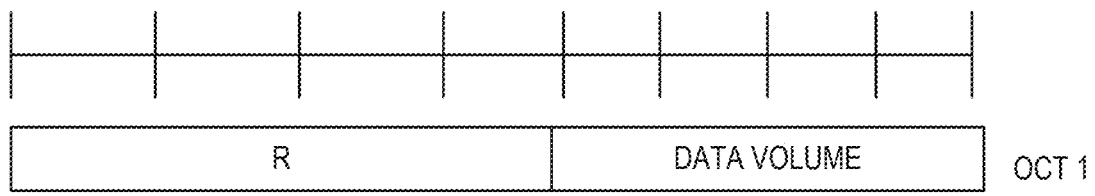

FIG. 3A illustrates a MAC CE example of a reconfiguration request for PUR data volume or pending packet size. The eNB may reconfigure the UL Grant resource of the PUR based on this information. This request may also be implemented indirectly as shown in FIGS. 3G-I, or another combination, such as setting other information to the currently used value.

Figure 3B:
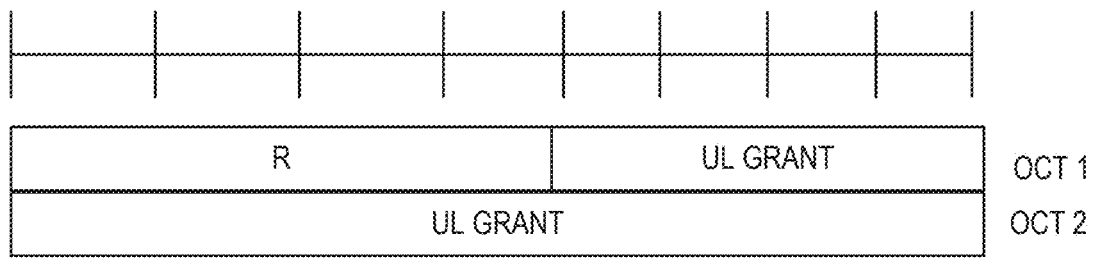

FIG. 3B illustrates a MAC CE example for the UL Grant and Uplink Repetition Reconfiguration Request. The eNB may reconfigure the UL Grant resource of the PUR based on this information. This request may also be implemented indirectly by any of FIGS. 3G-I, or another combination, such as setting other information to the currently used value.

Figure 3C:
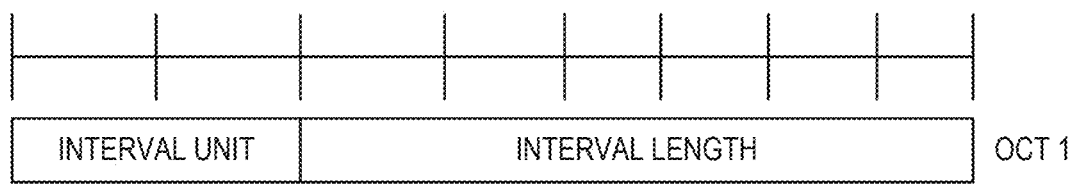

FIG. 3C illustrates a MAC CE example for the PUR data transmission interval reconfiguration request eNB based on this information reconfiguration of UL Grant resources interval of PUR. This request may also be achieved indirectly by any of FIGS. 3G-I, or another similar combination of resource requests, such as other information set to the value currently in use.

Figure 3D:
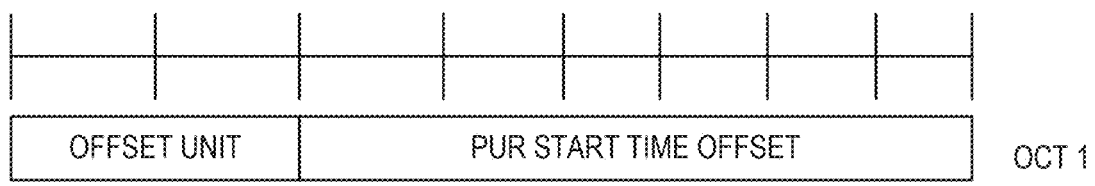

FIG. 3D illustrates a MAC CE example based on time domain resources PUR relative time (PUR Start Time Offset) reconfiguring the MAC CE exemplary Request. A previous eNB may start position based on this information PUR resources reconfiguration of UL Grant, the starting time offset PUR (PUR Start Time Offset) may be offset with respect to the current time, or with respect to the start timing of the last PUR Offset. This request can also be implemented indirectly via FIG. 3H or other similar combination of resource requests, such as setting other information to the currently used value.

Figure 3E:
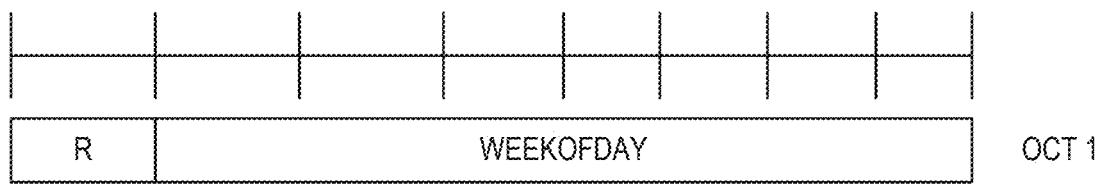

FIG. 3E illustrates a MAC CE exemplified unequally spaced periodic traffic pattern request. This example uses bitofWeek BIT STRING(size(7)) as an example. The first bit is 1 to indicate that the day of the week has PUR transmission requirements. Such a request UE can indicate which hours of the day there are PUR transmission requirements (bitofDay BIT STRING(size(24))) or which days of the month have PUR transmission requirements bitofMonth BIT STRING(size(31)). This request can also be implemented by FIG. 3H or other similar combination of resource requests.

FIG. 3F illustrates a MAC CE example of a PUR resource configuration index when there are multiple sets of PUR resources for the same UE. The eNB may identify the PUR resource sequence number to be configured or reconfigured based on this information. This information will generally only appear in coexistence with other MAC C E information, such as MAC CE (FIG. 3H) or other similar resource request combinations.

FIG. 3G illustrates a MAC CE example of a PUR data amount or a pending packet size, and/or a resource interval reconfiguration request. The eNB may reconfigure the UL Grant resource of the PUR and/or the UL Grant resource interval based on this information; this request may also be implemented indirectly by FIGS. 3F-G. For example, the start time is set to the current time.

FIG. 3H illustrates a case where multiple sets of PUR resources exist, the MAC CE example of PUR resource configuration and/or reconfiguration including at least one of the following information: PUR data volume or pending packet size, PUR resource interval, interval, etc., PUR periodic service time domain information, the beginning of the resource based on the relative time between PUR (PUR start time Offset). The eNB may reconfigure the UL Grant resource of the PUR based on this information.

FIG. 3I illustrates a MAC CE example for a PUR resource configuration and/or reconfiguration request based on absolute time. Based on this information the eNB may configure or reconfigure UL Grant of PUR as at least one information resource: PUR amount of data to be transmitted or a packet size, spacing PUR resources, resources based on the absolute time of the start time of PUR (PUR Start Time). The information may also be combined with (f) a reconfiguration request identifying multiple sets of PUR resources; and (e) combined with a configuration or reconfiguration request indicating periodic PUR traffic with unequal intervals. PUR-based resource absolute time start time, may be characterized as an absolute time, such as: YY: MM: DD: HH: MM: SS or may be converted to YY: MM: DD: HH: MM: SS time stamp.

FIG. 3J illustrates a MAC CE example of a R/F2/E/LCID/ (R/R/eLCID) MAC sub header. The MAC CE as illustrated in any of FIGS. 3A-I can define multiple independent MAC CEs (corresponding to 9 different LC-IDs respectively) and be characterized by the MAC subheader.

FIG. 3K illustrates a MAC CE example of a R/F2/E/ LCID/(R/R/eLCID) MAC sub header. MAC CE examples in FIGS. 3A-I can also MAC CE a variable length (corresponding to a LC-ID) and treated with the MAC sub header characterized in FIG. 3K (L domains characterize the length of the MAC CE), for the same length of the MAC CE can be characterized by the value of certain bits in the MCE CE.

For example, MAC CE as shown in FIGS. 3A-C may include a length of 1 Oct. It can be judged by the R domain:

the length is one Oct, and the leftmost 4 bits are all 0 for MAC CE (a); otherwise, it is MAC CE (c)).

Example Embodiment 3

FIGS. 4A-F illustrate examples of MAC CE for a PUR resource release request. The MAC CE PUR resource release request may include at least one of the following information: PUR resource release indication, PUR resource identifier (resource identifier of different cell PUR, PUR resource configuration index for multiple sets of PUR resources).

The MAC CE may be defined as a plurality of independent MAC CE (respectively an LC-ID), or defined as a variable-length MAC CE (corresponding to an LC-ID. The domain may be characterized by the length of the MAC CE: different lengths contain different service pattern information, and different information of the same length is identified by the bit value in the MAC CE).

Figure 4A:
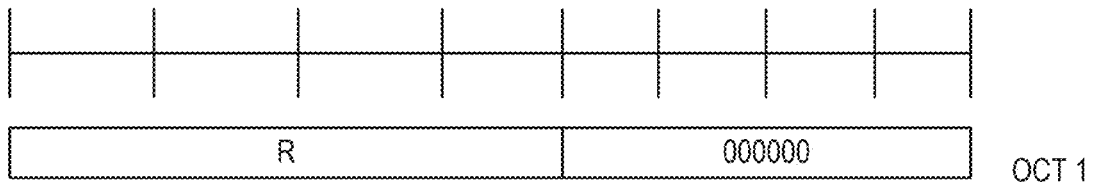

FIG. 4A illustrates an example MAC CE for a PUR resource release request. The eNB may release the PUR resource based on this information; this request may also implement the release of PUR resources of other cells and/or release a set of multiple sets of PUR resources by combining the MAC CE as illustrated in FIGS. 4B-C.

Figure 4B:
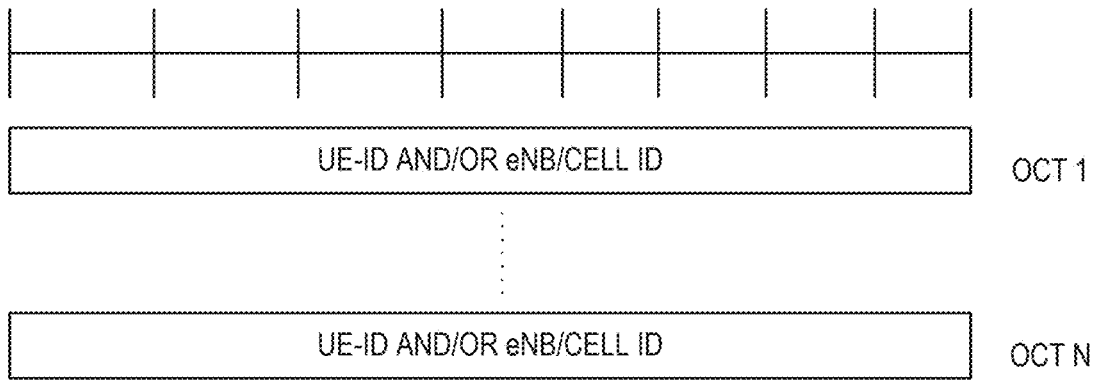

FIG. 4B illustrates an example MAC CE of a PUR resource release request for a different cell. The eNB may indicate that the target cell where the PUR resource of the UE is located releases the PUR resource based on the information. In the UE-ID and/or eNB/Cell ID, the eNB that can receive the MAC CE can find the target cell where the PUR resource is located and the identifier of the UE in the PUR resource, and specifically, the UE-ID and the cell ID pass an identifier. To indicate, for example, Resume Identity or I-RNTI in UP Solution; it may also be separately identified for UEID and eNB/Cell ID: for example, UE-ID may be C-RNTI or S-TMSI; cell ID may be cell PCI or cell global identity (CellIdentity).

Figure 4C:
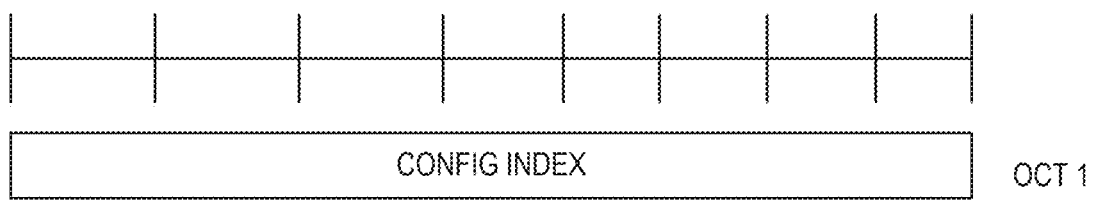

FIG. 4C illustrates a MAC CE example of a PUR resource configuration index when there are multiple sets of PUR resources for the same UE. Based on this information, the eNB can identify the target PUR resources that need to be released (for example, which set of multiple sets of PUR resources are released).

Figure 4D:
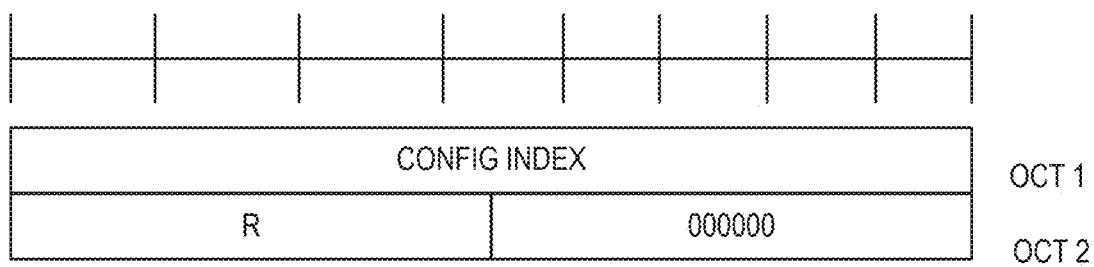

FIG. 4D illustrates a combination of the MAC CE as shown in FIGS. 4A and 4C. This MAC CE may indicate which of multiple sets of PUR releasing resources in the resource PUR. The MAC CE as illustrated in any of FIGS. 4A-D can define four independent MAC CEs (corresponding to 4 different LC-IDs respectively) and be characterized by the MAC sub header illustrated in FIG. 4E.

The MAC CE as shown in any of FIGS. 4A-D may also be a variable length by a MAC CE (corresponding to an LC-ID) and treated with the MAC sub header in FIG. 4F characterized (L domains characterize the length MAC CE).

Further, any of the example MAC CE as shown herein may together form a variable length MAC CE to characterize different configurations of PUR (corresponding to an LC-ID), reconfiguration, the MAC CE release request.

Example Embodiment 4

Figure 5:
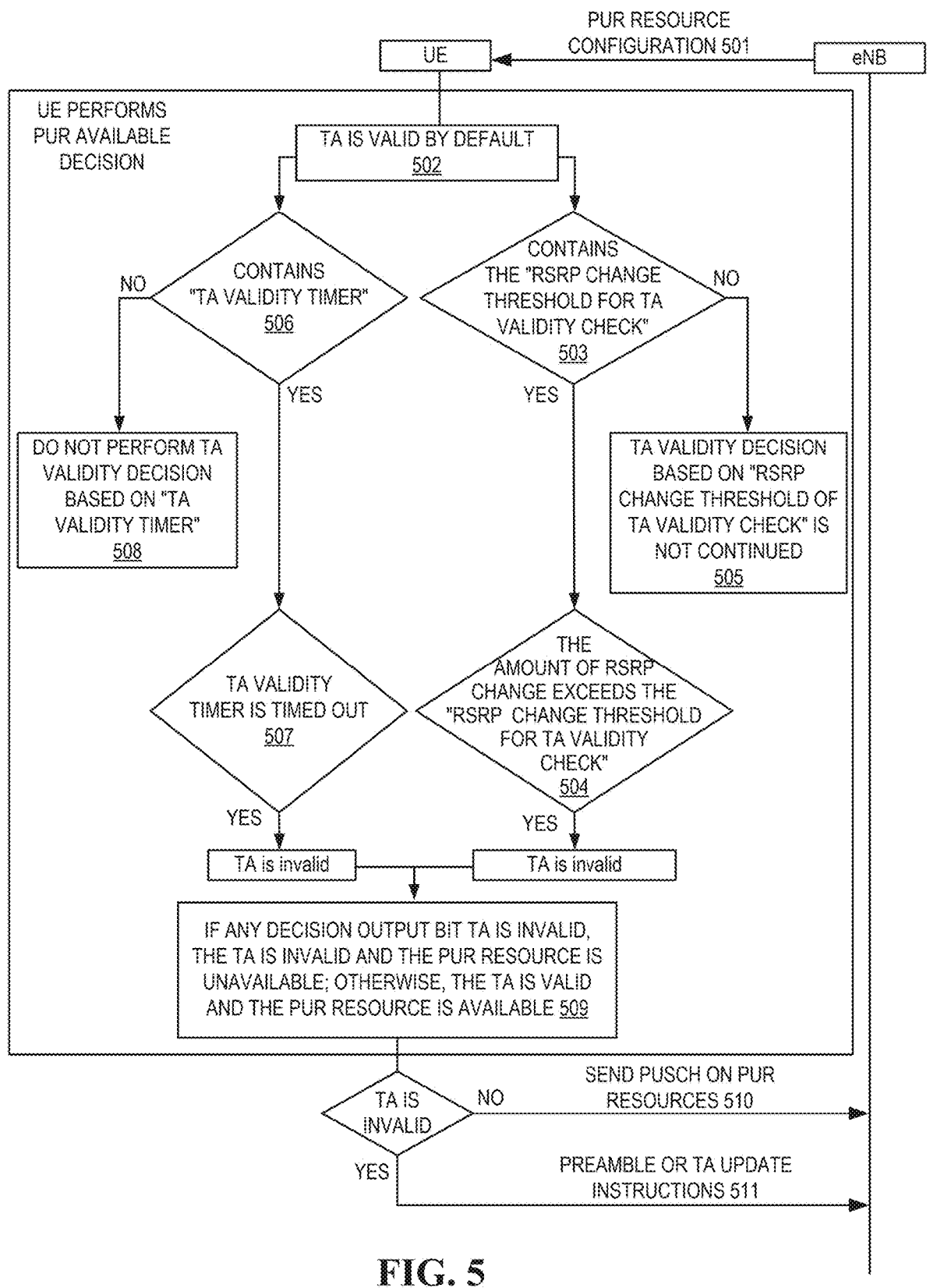
FIG. 5 illustrates a flow chart of a timing advance (TA) validity determination of the PUR resource.

FIG. 5 illustrates a flow chart of a timing advance (TA) validity determination of the PUR resource. At step 501, the UE receives the PUR resource configuration. When the PUR resource is used, the TA validity judgment of the PUR resource is performed. If the TA of the PUR resource is valid, and a cell reselection and an enhanced coverage level (CEL) change has not occurred since the PUR resource configured, the PUR resource can be used; otherwise, the PUR resource is unavailable. The TA validity decision process for PUR resources is as follows:

Step 502: The TA of the default PUR resource of the UE is valid.

Step 503: The UE receives the RSRP change threshold for the TA validity check of the PUR resource. If the RSRP change exceeds the RSRP change threshold (Step 504), the TA is considered invalid. If the UE does not receive a RSTP change threshold, the TA validity decision based on RARP change threshold of TA validity check is not continued (Step 505).

Step 506: The UE may receive the TA validity Timer for the TA validity check of the PUR resource. If the Timer times out (Step 507), the TA is considered invalid. If there is no TA validity timer received at the UE, the UE does not perform a TA validity decision based on TA validity timer (Step 508). If no output TA is invalid in any of the above decisions, the TA is considered valid and the PUR resource is available. When the UE considers that the TA is invalid, the PUR resource is unavailable (Step 509). If the TA is valid, the UE may send PUSCH on the PUR resources (Step 510).

The UE may to initiate a PRACH procedure (send a Preamble to the eNB) (Step 511) or send a TA update indication or resource scheduling indication to the eNB when the uplink data is sent in the PUR resource time domain location, triggering the eNB to send an update. TA command and radio resource scheduling through PDCCH.

The statistical method of the RSRP variation may include the UE recording or updating the RSRP of the serving cell to the reference RSRP at a time of at least one of the following: the UE receives the PUR resource configuration or reconfiguration information; the UE receives the TA update indication; the UE performs the data transmission on the PUR resource.

The absolute value of the difference between the RSRP measurement value of the service cell and the reference RSRP may be used as the amount of change of the RSRP.

The decision mechanism of whether the TA validity timer expires may include the UE starts or restarts the TA validity Timer at a time when at least one of the following : when the UE receives the PUR resource configuration or reconfiguration information; the UE receives the TA update indication; when the UE completes the data transmission on the PUR resource.

When the TA validity timer expires, the TA of the PUR resource may be considered invalid. The TA update indication can be carried by the MAC CE (e.g.: Timing Advance Command MAC Control Element) or carried by the PDCCH DCI.

Example Embodiment 5

Figure 6:
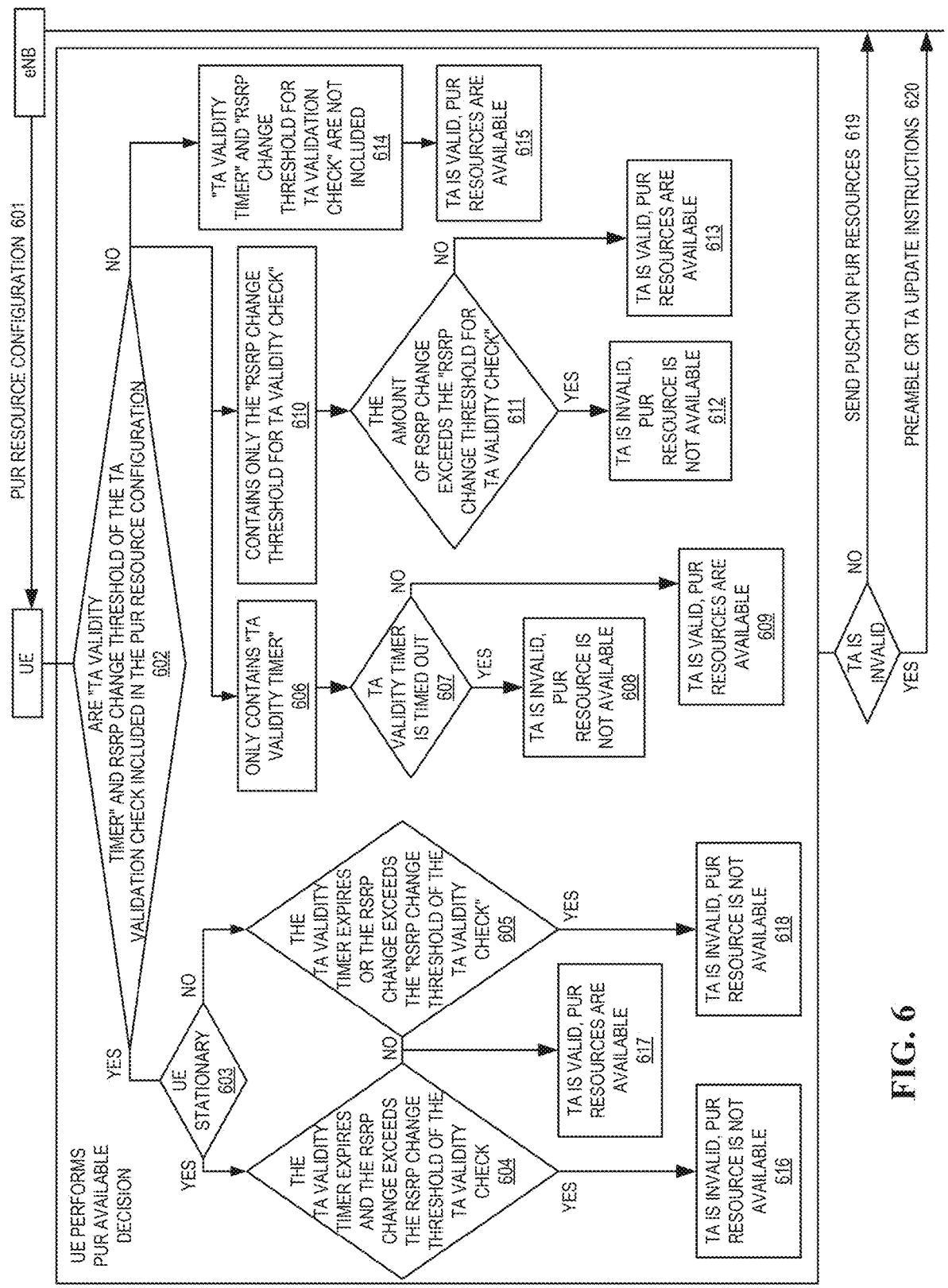
FIG. 6 illustrates a flow process to perform a validity check of a PUR resource.

FIG. 6 illustrates a flow process to perform a validity check of a PUR resource. The UE may receive the PUR resource configuration. When the PUR resource is used, the TA validity judgment of the PUR resource is performed. If the TA of the PUR resource is valid, and a cell reselection and an enhanced coverage level(CEL) change has not occurred since the PUR resource configured, the PUR resource can be used; otherwise, the PUR resource is unavailable. The TA validity decision process for PUR resources is as follows:

The UE may not receive TA validity check of resources for PUR change RSRP threshold and TA effectiveness Timer. In this event, the TA PUR validity check of resources may not be considered valid TA.

The UE may only receive the RSRP change threshold for the TA validity check of the PUR resource. If the RSRP change exceeds the RSRP change threshold, the TA is considered invalid; otherwise, the TA is considered valid.

The UE may only receive the TA validity Timer for the TA validity check of the PUR resource. If the TA validity timer expires, the TA is considered invalid; otherwise, the TA is considered valid.

The UE may receive the RSRP change threshold and the TA validity Timer for the PUR validity check. For a UE in a static state, if the following two conditions are met at the same time, the PUR resource TA is considered invalid; otherwise, the TA is considered to be valid: the RSRP change exceeds the RSRP change threshold, and the TA is not updated longer than the TA validity Timer expires. For the UE in the mobile state, the PUR resource TA is considered invalid if any of the following two conditions are met; otherwise, the TA is considered to be valid: the RSRP change exceeds the RSRP change threshold, and the TA is not updated longer than the TA validity Timer expires. When the UE that TA invalid, the PUR resources are not available, if the UE wants to transmit uplink data in PUR resource temporal location, initiating a PRACH procedure (transmitting Preamble to eNB) or send TA update indication or resource scheduling indication to the eNB, triggered The eNB transmits an update TA command and performs radio resource scheduling through the PDCCH.

The statistical method of the RSRP variation includes the UE recording or updating the RSRP of the serving cell to the reference RSRP at a time of at least one of the following: the UE receives the PUR resource configuration or reconfiguration information; the UE receives the TA update indication; and/or the UE performs the data transmission on the PUR resource.

The absolute value of the difference between the RSRP measurement value of the serving cell and the reference RSRP is used as the amount of change of the RSRP. The decision mechanism of whether the TA validity timer expires may include: the UE starts or restarts the TA validity Timer at a time when at least one of the following: when the UE receives the PUR resource configuration or reconfiguration information; the UE receives the TA update indication; when the UE completes the data transmission on the PUR resource.

When the TA validity timer expires, the TA of the PUR resource is considered invalid. The TA update indication can be carried by the MAC CE (e.g.: Timing Advance Command MAC Control Element) or carried by the PDCCH DCI.

Example Embodiment 6

Figure 7:
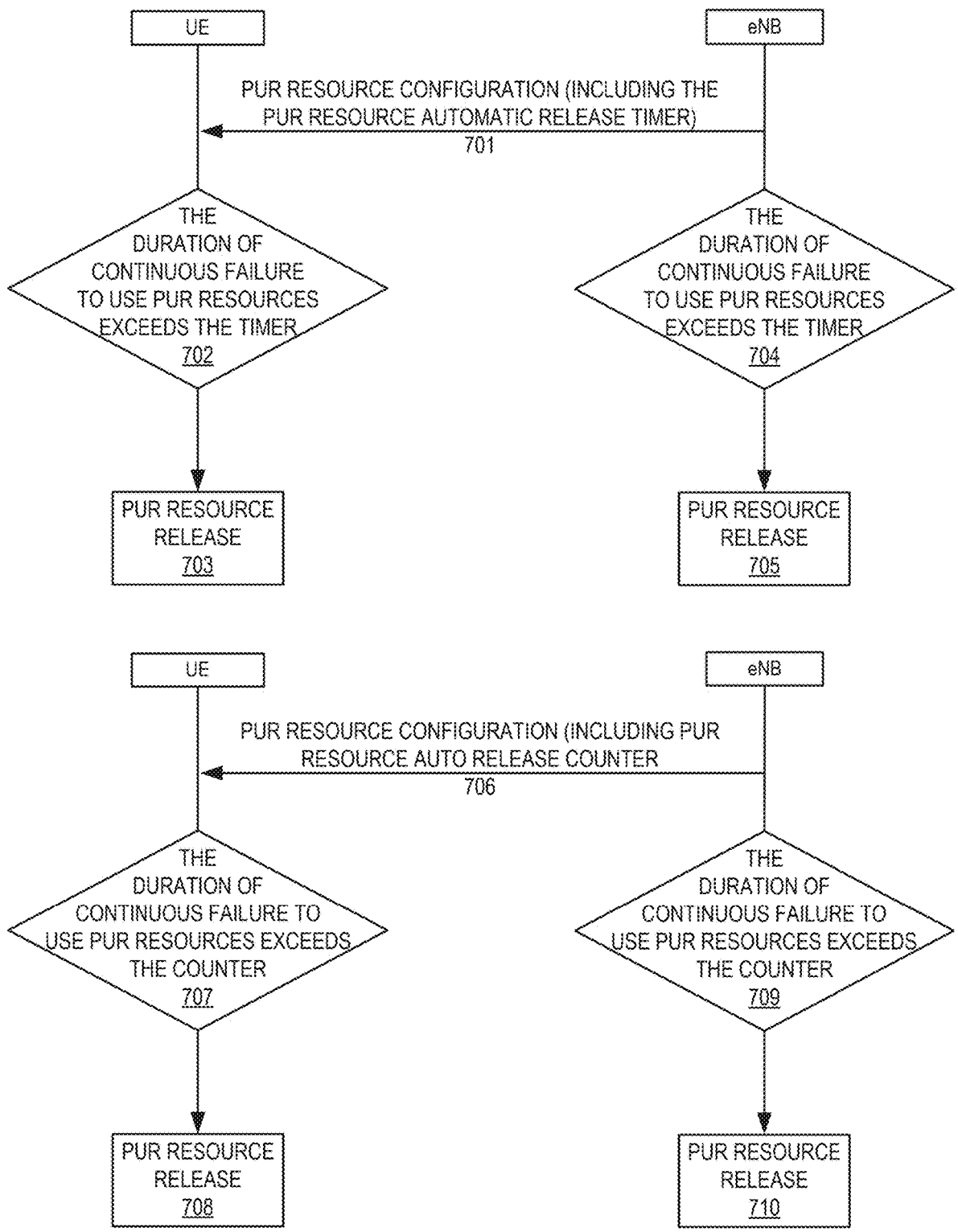
FIG. 7 illustrates an example automatic resource release method for consecutively unsuccessful use of PUR resources.

FIG. 7 illustrates an example automatic resource release method for consecutively unsuccessful use of PUR resources. When the eNB configures PUR resources to the UE, the UE may be configured to automatically release resources PUR timers and/or counters. When the duration of the PUR resource that the UE does not use continuously exceeds the timer and/or the number of times the UE fails to use the PUR resource continuously exceeds the counter, the UE may automatically release the PUR resource.

The specific implementation method based on the timer may include the PUR resource time domain location being reached, and the UE unsuccessfully uses the PUR resource for uplink data transmission, the PUR automatic release timer may be started. If the UE successfully transmits uplink data once using the PUR resource, the PUR automatic release timer may be stopped. If the auto-release timer expires PUR (PUR resource allocation exceeds the automatic release timer), PUR may automatically release the resource.

The specific implementation method based on the counter may include the initial value of the PUR auto release counter being 0. If the PUR resource time domain location is reached, and the UE unsuccessfully uses or fails to use the PUR resource for uplink data transmission, the PUR automatic release counter may be incremented by one. If the UE successfully transmits uplink data once using the PUR resource, the PUR automatic release counter may be reset to 0. If the PUR auto-release counter value exceeds the value of the pre-configured counter, the PUR resource may be automatically released, or a PUR resource release request may be initiated.

The continuously unsuccessful use of resources for uplink data transmission PUR by the UE means that the UE does not transmit data on the uplink resource PUR, or the UE transmits uplink data resource on PUR, but did not receive a positive acknowledgment feedback eNB.

In some embodiments, from the eNB perspective, UE continuously unsuccessful use of PUR resources for uplink data transmission means that the eNB on PUR resource does not detect the uplink data sent by the UE, or eNB on PUR resource detects the uplink data sent by the UE, but The UE was not successfully sent a positive acknowledgement (not sent or failed to send).

The counter can also be split into two based on reasons for unsuccessful use. The number of consecutive uplink data transmissions that the UE may not use PUR resources when the number of uplink data transmissions is not used for PUR resources, the PUR resources may be released by the West.

The counter may be split based on UE continuous use of resources, but the number of successes reaches the number of pre-configured (the default counter is 0). In this event, the UE may immediately initiate a PRACH procedure and trigger the release of PUR resources.

Example Embodiment 7

Figure 8:
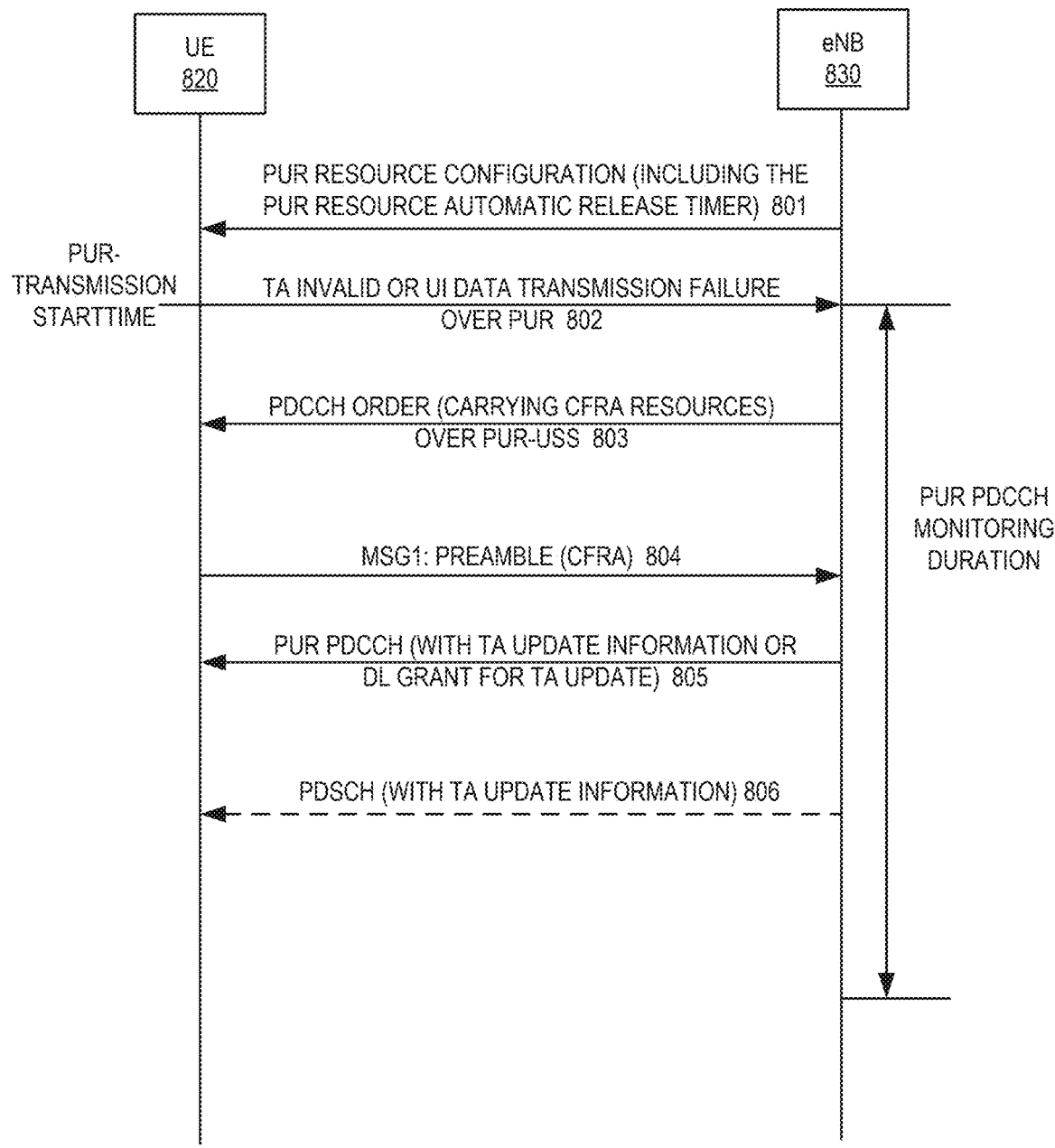
FIG. 8 illustrates a eNB triggered TA update process.

FIG. 8 illustrates a eNB triggered TA update process. The UE may receive the PUR resource configured by the eNB. The eNB may send a PDCCH Order carrying the CFRA resource to the UE on the PUR-USS (PUR-PDCCH). After receiving the PDCCH Order, the UE may send a Preamble on the CFRA resource. The eNB, based on the UE identified Preamble, and PUR-PDCCH scheduling on the UE PUR-USS, the PUR-PDCCH carries TA update information or DL Grant. If the PUR-PDCCH carries the DL Grant, the eNB may send the PDSCH on the DL Grant and carries the Timing Advance Command MAC CE on the PDSCH.

The PDCCH monitoring is performed with the following rules after the preamble. If the PUR PDCCH monitoring does not time out, or the PUR-dedicated RNTI is still valid, Msg2 may be scheduled with PUR-USS. Otherwise, Msg2 for RAR may be scheduled with CSS-RA.

Example Embodiment 8

Figure 9A:
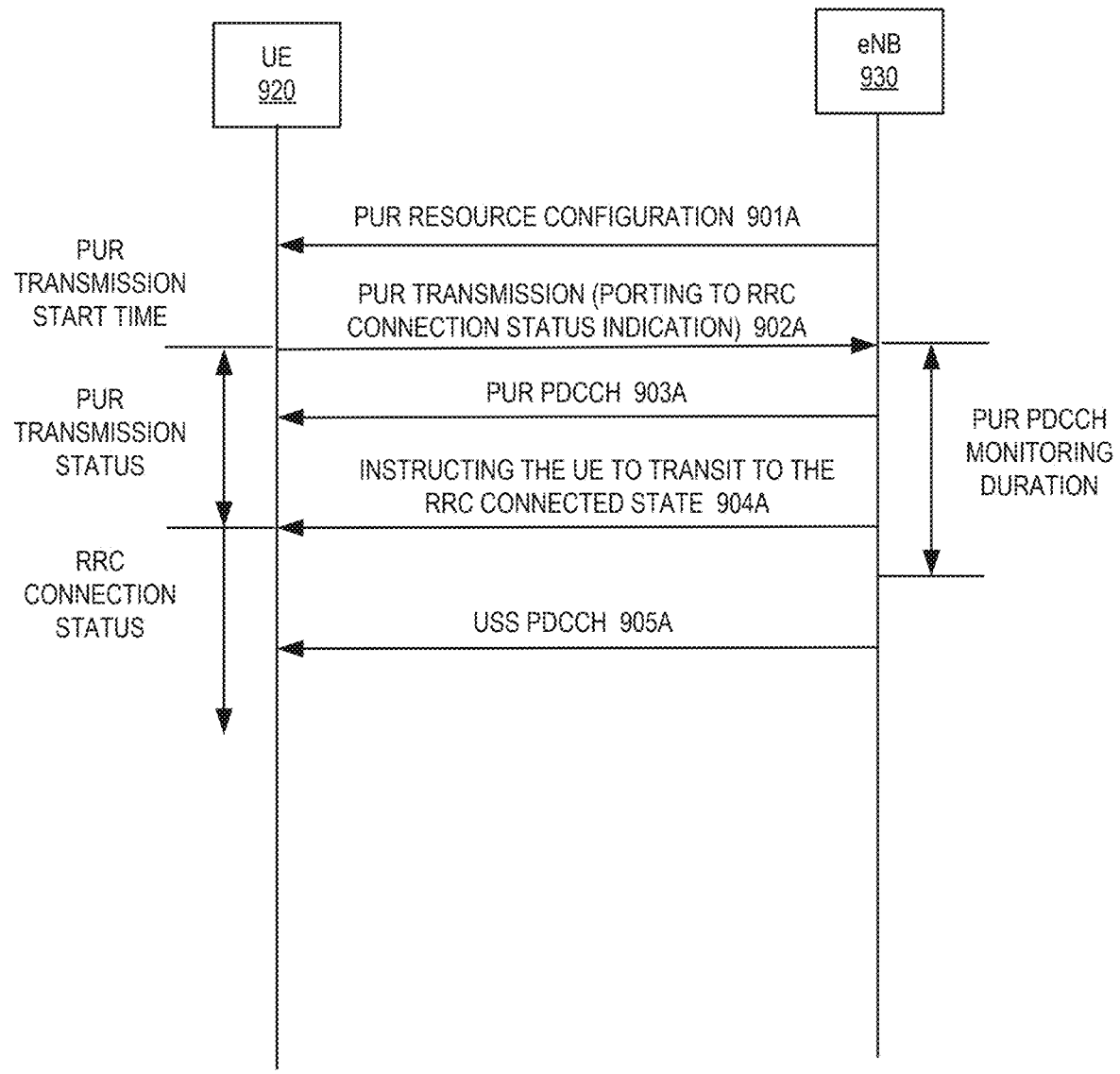
FIG. 9A-9B illustrates a signaling process of a UE sending an RRC state transition request.
Figure 9B:
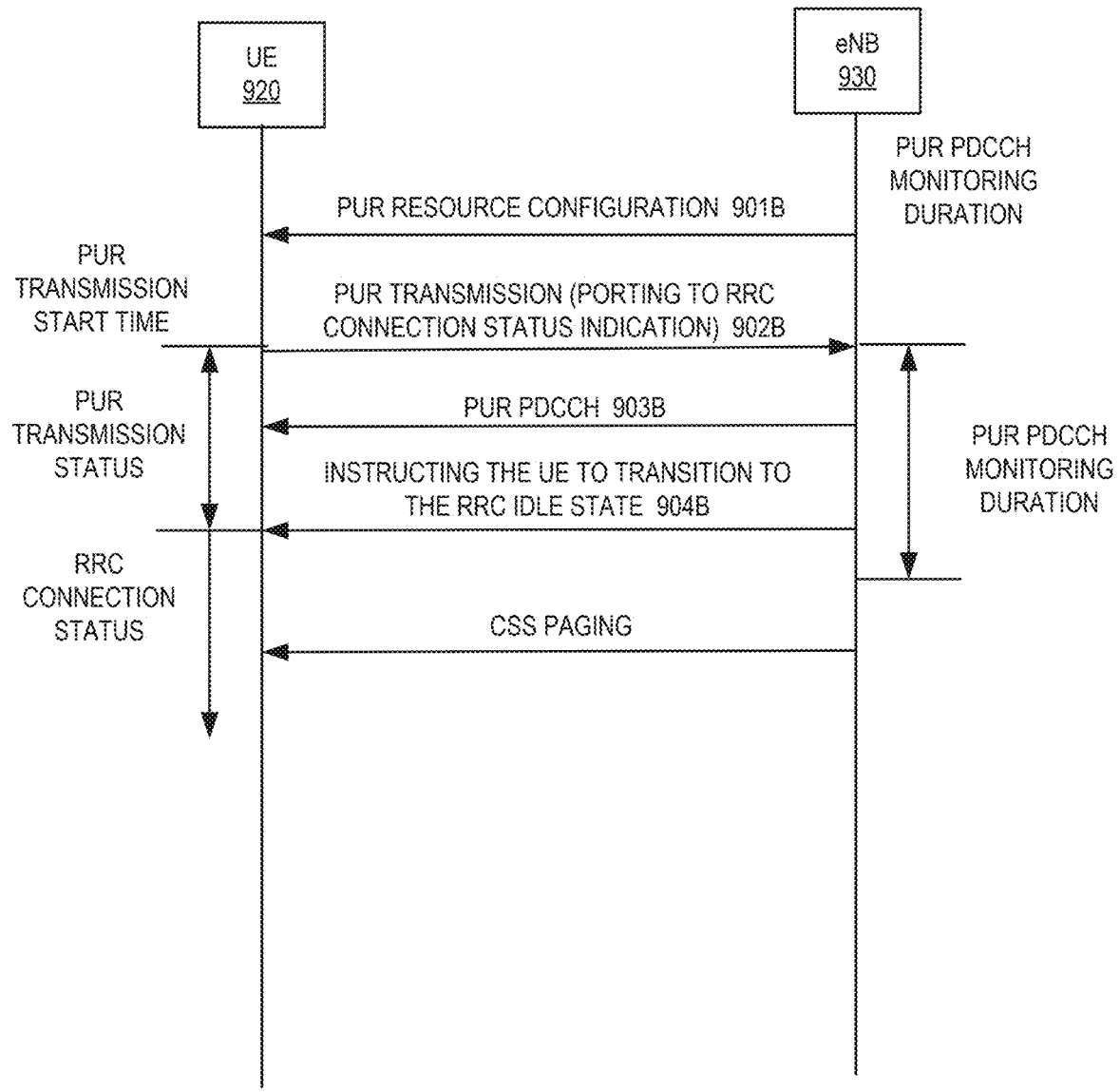

FIGS. 9A-B illustrate a signaling process of a UE sending an RRC state transition request. After receiving the PUR resource configured by the eNB, the UE may send the uplink information on the PUR resource, where the RRC state transition indication is carried. The state transition indication may be used to instruct the eNB to switch the UE to the RRC idle state or to switch the UE to the RRC connected state.

The RRC state transition indication may also be carried on the PUR-PDCCH scheduled PUSCH resource. When the eNB receives an indication to switch to the connected state, the state transition of the UE to the connected state may be triggered. When the eNB receives an indication to transition to the idle state, the state transition of the UE to the idle state may be triggered.

FIG. 9A is an example of a state transition indication to the connected state. The indication of the transition to the RRC connection state may be a BSR MAC CE whose Buffer size is not 0, or an explicit state transition indication. The eNB may indicate that the UE enters the RRC connected state and may pass the RRC Msg4 message, the RRC reconfiguration message, the DCI, and the MAC CE. After receiving the indication from the eNB, the UE may start monitoring the PDCCH according to the USS in the connected mode.

FIG. 9B is an example of a state transition indication to the idle state. The indication of transitioning to the RRC idle state may be a BSR MAC CE with a Buffer r size of 0, or an explicit state transition indication. The eNB may indicate that the UE enters the RRC idle state and can pass the RRC release message, DCI, or MAC CE. After receiving the indication from the eNB, the UE may start monitoring the PDCCH according to the CSS-Paging in the idle mode.

Example Embodiment 9

Figure 10A:
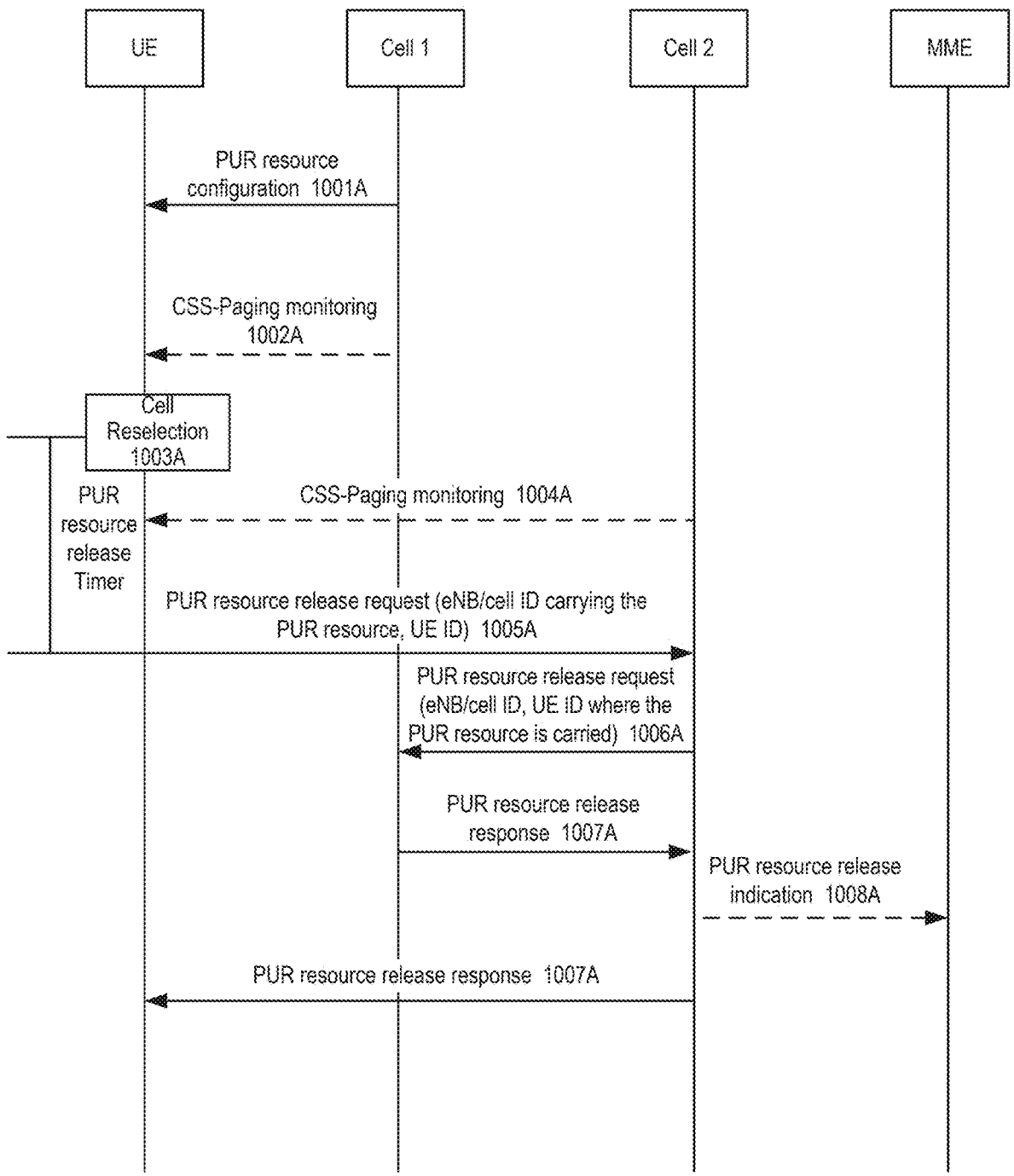
FIGS. 10A-10B illustrate a signaling process to request a resource release process after a cell reselection.
Figure 10B:
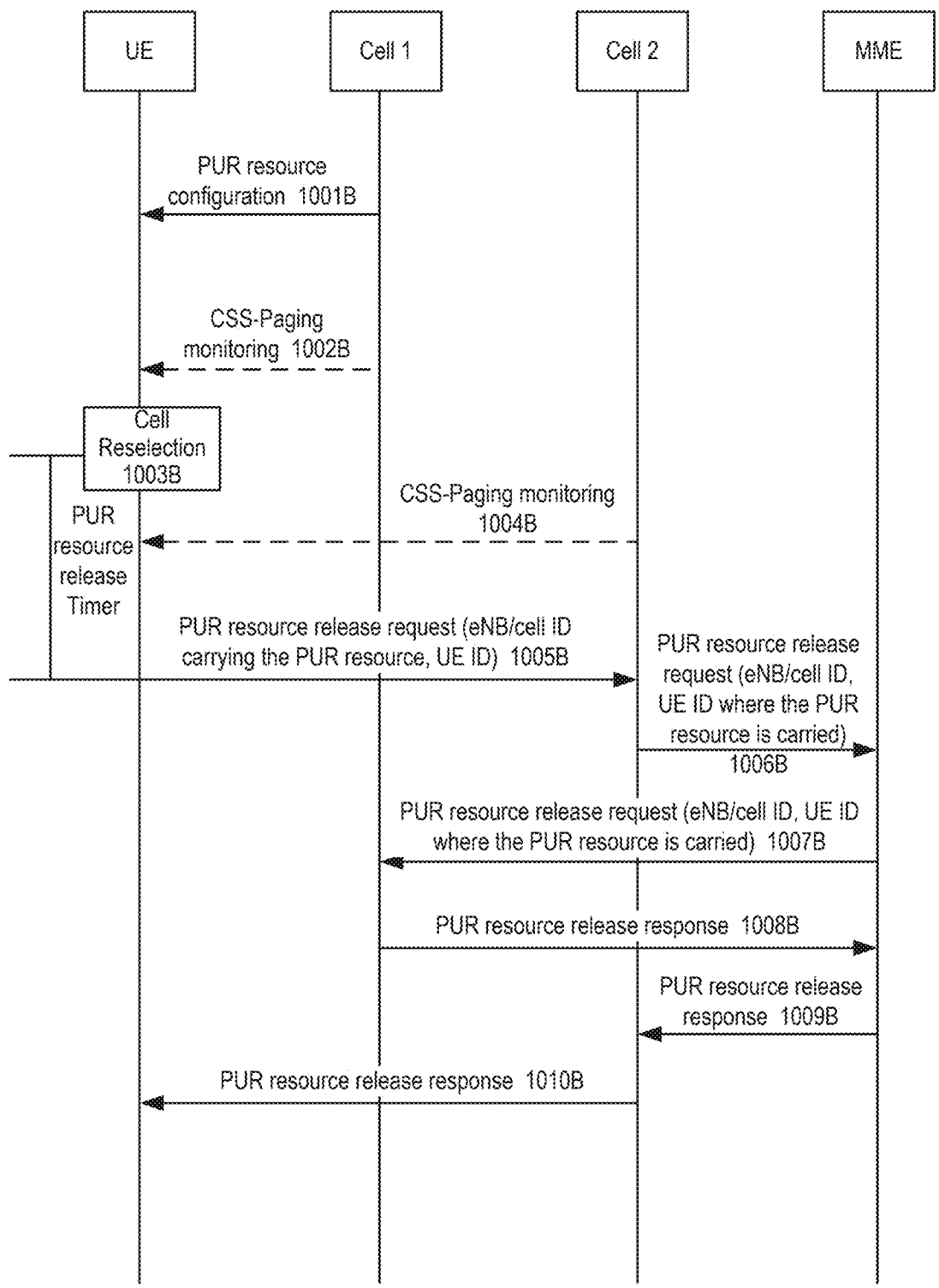

FIGS. 10A-B illustrate a signaling process to request a resource release process after a cell reselection. The UE camping on a first communication node (or "cell 1") may receive the PUR resource configured by cell 1. A UE residing in cell 1 (cell monitor CSS-Paging 1) may change to a second communication node (or "cell 2") (cell monitor the CSS-Paging 2) after a cell reselection process has occurred.

After the cell reselection occurs, the UE may start the PUR resource release timer. If the timer expires and the PUR resource is still not released, the UE may initiate a PUR release process. The timer may be set to 0 or not set (default is 0). At this time, once the cell reselection occurs, the PUR resource may be requested to be released immediately and/or the UE may not actively request to release the D-PUR resource but waits. The request for releasing the D-PUR resource may be carried along with the path when the target cell initiates the service.

The release process of the PUR resource may be initiated by the UE. The UE may send a PUR release request to the cell 2. The release request may be sent through a PUR resource or by triggering a PRACH procedure. The release request may include an identifier that identifies the PUR resource, such as a UE identifier and an identifier of the cell 1, or a ResumeIdentity or an I-RNTI of the UP scheme. The content of the release request may be carried in an RRC message or a MAC CE (see FIG. 2).

Cell 2 may transmit a release request to cell 1, signaling the UE Specific release request via the S1 interface or X2 interface transmission directly, or indirectly by sending the UE Specific MME S1 interface signaling. The sending request may carry an identifier that identifies the PUR resource (such as the U E identifier and the identifier of the cell 2, or the ResumeIdentity or I-RNTI of the UP scheme), and/or the PUR resource release indication.

Cell 1 may send a PUR release response to the cell 2. The PUR resource release response may be sent by the UE Specific signaling of the X2 port or the S1 port. Cell 2 may send a PUR resource release response to the UE (see step 202 of FIG. 2). If the release request is sent by the UE specific signaling of the X2 interface, the cell 1 may send a PUR release indication to the MME after receiving the PUR release request of the cell 2.

The release indication may also be directly or indirectly from the cell 2 to the MME. A direct indication of the cell to the MME may carry UE Specific explicit signaling release indication information. An indirect indication of the cell 2 to the MME may indicate said dedicated resource information of the UE PUR of cell 2. The PUR dedicated resource of the UE in the cell 1 may be released. If the release request is sent by the UE specific signaling of the S1 interface, the cell 1 may not send a release PUR message to the MME after receiving the PUR release request of the cell 2.

Figure 11:
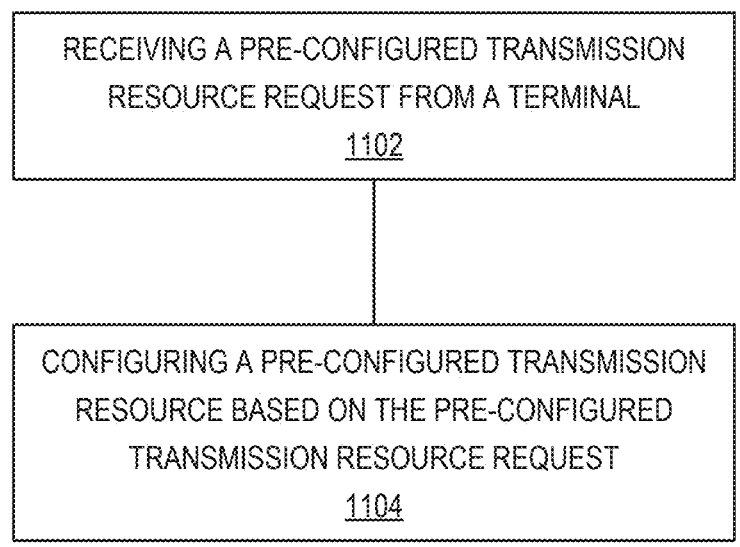
FIG. 11 illustrates a method for configuring a pre-configured transmission resource.

FIG. 11 illustrates a method for configuring a pre-configured transmission resource. The method includes receiving a pre-configured transmission resource request from a terminal (block 1102). The pre-configured transmission resource request may include information identifying a pre-configured transmission resource (or "pre-configured uplink resource (PUR) as described in example embodiments 1 to 9). The terminal may include a UE as described in example embodiments 1 to 9.

A communication node (or "eNB" as described in example embodiments 1 to 9, configures a pre-configured transmission resource based on the pre-configured transmission resource request (block 1104). The communication node may identify and configure a PUR resource based on a PUR request indicating the PUR resource.

In some embodiments, the method includes transmitting a message including an idle mode pre-configured transmission resource support capability to the terminal.

In some embodiments, the idle mode pre-configured transmission resource support capability is included within one of a system information block (SIB) of the message and a terminal-specific downlink message to the terminal.

In some embodiments, the method includes transmitting, by the communication node, a radio resource control (RRC) message to the terminal including a traffic pattern report request for the pre-configured transmission resource to the terminal, wherein a pre-configured transmission resource capacity of the communication node is included within the RRC message.

In some embodiments, the pre-configured transmission resource request includes a request for a pre-configured transmission resource configuration including at least one of: a service pattern for a pre-configured transmission resource transmission, a power headroom report (PHR) information, a terminal speed indication, a terminal capability of supporting pre-configured transmission resource configuration in idle mode, and wherein the service pattern of the pre-configured transmission resource transmission includes at least one of: a data volume to be transmitted, a data transmission interval, a data transmission start time, a data transmission end time, a data transmission duration, and a maximum data transmission delay.

In some embodiments, the pre-configured transmission resource request includes a request for a pre-configured transmission resource release message, and wherein the pre-configured transmission resource is a pre-configured uplink resource (PUR).

In some embodiments, the pre-configured transmission resource request is included within one of an RRC message and a medium access control (MAC) control element (CE).

In some embodiments, the method includes transmitting, by the communication node, a message including the pre-configured transmission resource configuration to the terminal.

In some embodiments, the method includes transmitting, by the communication node, a message including the pre-configured transmission resource configuration to the terminal.

In some embodiments, the pre-configured transmission resource configuration includes a pre-configured transmission resource delivery information relating to at least one of: a pre-configured transmission resource uplink (UL) grant, a pre-configured transmission resource interval resource, a pre-configured transmission resource start time of data transmission resources, a number of physical uplink shared channel (PUSCH) transmission repetitions carried on a pre-configured transmission resource, a physical downlink control channel (PDCCH) search space, a maximum duration of monitoring the PDCCH search space, and a pre-configured transmission resource configuration information.

In some embodiments, the method includes receiving, by the communication node, a PUSCH message over the pre-configured transmission resource from the terminal, wherein the PUSCH message includes at least one of: a data PDU, a NAS PDU, a RRC message, a power headroom report (PHR) MAC CE, a data volume and power headroom report (DPR) MAC CE, an extended DPR (eDPR) MAC CE, and a terminal speed indication.

In some embodiments, the method includes transmitting, by the communication node, a message including the pre-configured transmission resource reconfiguration to reconfigure at least some information in the pre-configured transmission resource.

In some embodiments, the method includes transmitting, by the communication node, a message including the pre-configured transmission resource release indicating a release of pre-configured transmission resource configured resources.

In some embodiments, the pre-configured transmission resource release is included within an RRC message or a MAC CE to the terminal.

In some embodiments, the pre-configured transmission resource release is indicated by one of an acknowledgement for pre-configured transmission resource transmission or an indication field in the DCI.

In some embodiments, the message is matched with a service pattern of the pre-configured transmission resource request by at least one of a one-time pre-configured transmission resource configuration, an equal interval periodic resource configuration, and an unequal interval periodic resource allocation.

In some embodiments, the method includes determining, by the communication node, a terminal idle mode pre-configured transmission resource support capability based on a terminal capability of the terminal.

In some embodiments, the pre-configured transmission resource request is included within one of an RRC message and a downlink MAC CE.

In an embodiment, a method for wireless communication, comprises receiving, by a communication node, a pre-configured transmission resource request from a terminal, wherein the pre-configured transmission resource request includes a medium access control (MAC) control element. The method also includes configuring, by the communication node, a pre-configured transmission resource based on the pre-configured transmission resource request.

In some embodiments, the pre-configured transmission resource request MAC control element includes at least one of: a data volume, a data packet to be transmitted, a pre-configured transmission resource uplink (UL) grant information, a pre-configured transmission resource time interval, a pre-configured transmission resource start time of data transmission resources, pre-configured transmission resource service pattern information, a number of physical uplink shared channel (PUSCH) transmission repetitions carried on a pre-configured transmission resource; a physical downlink control channel (PDCCH) search space, a power headroom report (PHR) information, a terminal speed indication, a power headroom report (PHR), a data volume and power headroom report (DPR), an extended DPR (eDPR) and a pre-configured transmission resource configuration information.

In some embodiments, the PUR resource request MAC requests at least one element of the preconfigured transmission resource, wherein the at least one element requested is at least one of a preconfigured transmission resource data volume, uplink grant information, and an interval length, and wherein the communication node is configured to reconfigure the preconfigured transmission resource based on receiving at least one element of the preconfigured transmission resource.

In some embodiments, the pre-configured transmission resource request MAC control element includes a medium access control (MAC) control element (CE) and is a time domain reconfiguration request for pre-configured transmission resources based on relative time requesting an offset unit and a pre-configured transmission resource start time offset, and wherein the communication node is configured to reconfigure a time domain of the pre-configured transmission resource based on the pre-configured transmission resource request.

In some embodiments, the pre-configured transmission resource request MAC control element is a periodic traffic pattern request requesting traffic pattern information reconfiguration, wherein the communication node is configured to reconfigure the pre-configured transmission resource based on receiving the traffic pattern information.

In some embodiments, the pre-configured transmission resource request MAC control element includes a request for a pre-configured transmission resource configuration index, wherein the terminal includes at least two sets of pre-configured transmission resources, and wherein the communication node is configured to identify a pre-configured transmission resource sequence number to be modified based on receiving the pre-configured transmission resource configuration index.

In some embodiments, the pre-configured transmission resource request MAC control element includes a request for a pre-configured transmission resource data volume and an interval length, and wherein the communication node is configured to reconfigure an UL grant resource and a UL grant resource interval of the pre-configured transmission resource based on receiving the pre-configured transmission resource data volume and the interval length.

In some embodiments, the Pre-configured transmission resource request MAC control element requests at least one of a pre-configured transmission resource data volume, a pre-configured transmission resource interval, a pre-configured transmission resource periodic service time domain information, a start time of a resource based on a pre-configured transmission resource relative time, wherein at least two sets of pre-configured transmission resources are included, and wherein the communication node is configured to reconfigure a UL grant resource of a pre-configured transmission resource.

In some embodiments, the pre-configured transmission resource request MAC control element is a configuration request based on absolute time that requests at least one of a pre-configured transmission resource amount of data to be transmitted, a pre-configured transmission resource spacing resources, and a resource based pre-configured transmission resource absolute time start time.

In some embodiments, the Pre-configured transmission resource request MAC control element sub-header can be one of: a sub-header identifying one independent MAC CE and a sub-header identifying multiple MAC CE with different MAC CE length values for independent MAC CE instances.

In an embodiment, a method for wireless communication comprises receiving, by a communication node, a pre-configured transmission resource release request from a terminal, wherein the pre-configured transmission resource release request includes an MAC control element. The method also includes releasing, by the communication node, a pre-configured transmission resource based on the pre-configured transmission resource release request.

In some embodiments, the pre-configured transmission resource release request MAC control element includes at least one of a pre-configured transmission resource release indication and a pre-configured transmission resource identifier.

In some embodiments, the method includes identifying, by the communication node, a target communication node based on a communication node identifier and a terminal identifier, wherein the pre-configured transmission resource release request MAC control element includes the terminal identifier identifying the terminal and the communication node identifier identifying a target communication node that includes the pre-configured transmission resource associated with the terminal.

In some embodiments, the pre-configured transmission resource release request MAC control element includes a pre-configured transmission resource configuration index, wherein the communication node is configured to identify and release a target pre-configured transmission resources when there are multiple sets of pre-configured transmission resources associated with the terminal.

In some embodiments, the pre-configured transmission resource release request MAC control element sub-header can be one of: a sub-header identifying one independent MAC CE instance, a sub-header defining multiple independent MAC CE instances with different MAC CE length values for independent MAC CE instances.

In an embodiment, a method for wireless communication comprises receiving, by a terminal, a message including a pre-configured transmission resource configuration from a communication node. The method also includes determining, by the terminal, validity of a pre-configured transmission resource associated with the pre-configured transmission resource configuration based on a timing advance (TA) validity determination.

In some embodiments, the TA validity determination further comprises: determining that the TA is invalid indicating that the pre-configured transmission resource associated with the pre-configured transmission resource configuration is unavailable.

In some embodiments, the TA validity determination further comprises: determining, by the terminal, that a cell reselection and a communication node change do not occur, indicating that the TA is valid and that the pre-configured transmission resource associated with the pre-configured transmission resource configuration is available.

In some embodiments, the TA validity determination further comprises: identifying, by the terminal, a RSRP change threshold included within the pre-configured transmission resource configuration message; determining, by the terminal, that a reference signal received power (RSRP) change exceeds the RSRP change threshold, wherein determining that the TA is invalid is based on determining that the RSRP change exceeds the RSRP change threshold.

In some embodiments, the TA validity determination further comprises: identifying, by the terminal, a TA validity timer included within the pre-configured transmission resource configuration message; determining, by the terminal, the TA validity timer has expired, wherein determining that the TA is invalid is based on determining that the TA validity timer expired.

In some embodiments, the TA validity determination further comprises: determining, by the terminal, a TA validity timer has not expired; determining, by the terminal, that a Reference Signal Received Power (RSRP) change falls below a RSRP change threshold, wherein determining that the TA is valid is based on determining that the TA validity timer has not expired and that the RSRP change falls below the RSRP change threshold.

In some embodiments, the method includes transmitting, by the terminal, a preamble to initiate a physical random-access channel (PRACH) procedure to the communication node based on determining that the TA is invalid.

In some embodiments, the method includes receiving, by the terminal, a TA update message from the communication node, wherein the TA update message is included within a medium access control (MAC) control element (CE) or a physical downlink control channel (PDCCH) downlink control information (DCI).

In some embodiments, the method includes transmitting, by the terminal, a physical uplink shared channel message on the pre-configured transmission resources to the communication node based on determining that the TA is valid.

In some embodiments, the method includes determining, by the terminal, that a TA validity timer and a RSRP change threshold are not included within the pre-configured transmission resource configuration, indicating that the TA is valid.

In some embodiments, the method includes determining, by the terminal, that a TA validity timer is not included within the pre-configured transmission resource configuration and a RSRP change threshold is included within the pre-configured transmission resource configuration, wherein determining that the TA is invalid is based on determining that a RSRP change exceeds the RSRP change threshold.

In some embodiments, the method includes determining, by the terminal, that a TA validity timer is not included within the pre-configured transmission resource configuration and a RSRP change threshold is not included within the pre-configured transmission resource configuration, wherein determining that the TA is valid is based on determining that a RSRP change falls below the RSRP change threshold.

In some embodiments, the method includes determining, by the terminal, that a TA validity timer is included within the Pre-configured transmission resource configuration and a RSRP change threshold is not included within the pre-configured transmission resource configuration, wherein determining that the TA is invalid is based on determining that the TA validity timer expired.

In some embodiments, the method includes determining, by the terminal, that a TA validity timer is included within the pre-configured transmission resource configuration and a RSRP change threshold is not included within the pre-configured transmission resource configuration, wherein determining that the TA is valid is based on determining that the TA validity timer has not expired.

In some embodiments, the method includes determining, by the terminal, that a TA update time is greater than a TA validity timer duration; determining, by the terminal, that a RSRP change exceeds a RSRP change threshold, wherein the TA is invalid based on determining that the TA update time is greater than the TA validity timer duration or that the RSRP change exceeds the RSRP change threshold.

In some embodiments, the method includes determining, by the terminal, that a TA update time is less than a TA validity timer duration; determining, by the terminal, that a RSRP change falls below a RSRP change threshold, wherein the TA is valid based on determining that the TA update time is less than the TA validity timer duration and the RSRP change falls below the RSRP change threshold.

In some embodiments, the method includes determining, by the terminal, that the terminal is in a static state; identifying, by the terminal, a TA validity timer and a RSRP change threshold; determining, by the terminal, that the TA is invalid based on determining that the TA update time is greater than a TA validity timer duration and determining that the RSRP change exceeds a RSRP change threshold.

In some embodiments, determining, by the terminal, that the terminal is in a static state; identifying, by the terminal, a TA validity timer and a RSRP change threshold; and determining, by the terminal, that the TA is valid is based on determining that the TA update time is less than a TA validity timer duration or determining that the RSRP change falls below a RSRP change threshold.

In some embodiments, determining, by the terminal, that the terminal is in a mobile state; identifying, by the terminal, a TA validity timer and a RSRP change threshold; and determining, by the terminal, that the TA is invalid is based on determining that the TA update time is greater than a TA validity timer duration or determining that the RSRP change exceeds a RSRP change threshold.

In some embodiments, determining, by the terminal, that the terminal is in a static state; identifying, by the terminal, a TA validity timer and a RSRP change threshold; and determining, by the terminal, that the TA is valid is based on determining that the TA update time is less than a TA validity timer duration or determining that the RSRP change falls below a RSRP change threshold.

In an embodiment, a method for wireless communication comprises receiving, by a terminal, a message including a pre-configured transmission resource configuration and a pre-configured transmission resource release instance from a communication node. The method also includes determining, by the terminal, a comparison between a duration of continuous inactivity of a pre-configured transmission resource associated with the pre-configured transmission resource configuration and the pre-configured transmission resource release instance.

In some embodiments, the pre-configured transmission resource release instance includes a timer, and wherein the timer is configured to release the pre-configured transmission resource based on the duration of continuous inactivity of a pre-configured transmission resource exceeding the timer.

In some embodiments, the timer is started based on a failure of the terminal to transmit an uplink data message using the pre-configured transmission resource at a pre-configured transmission resource time domain location included within the pre-configured transmission resource configuration.

In some embodiments, the method includes transmitting, by the terminal, an uplink data message using the pre-configured transmission resource at a pre-configured transmission resource time domain location included within the pre-configured transmission resource configuration, wherein the timer is stopped based on transmission of the uplink data message by the terminal.

In some embodiments, the pre-configured transmission resource release instance includes a counter, and wherein the counter is configured to release the pre-configured transmission resource based on the duration of continuous inactivity of a pre-configured transmission resource including a number of failure instances exceeding the counter.

In some embodiments, the counter is incremented based on a failure of the terminal to transmit an uplink data message using the Pre-configured transmission resource at a pre-configured transmission resource time domain location included within the pre-configured transmission resource configuration.

In some embodiments, the method includes resetting, by the terminal, the counter based on transmitting an uplink data message using the pre-configured transmission resource at a pre-configured transmission resource time domain location included within the pre-configured transmission resource configuration.

In some embodiments, the method includes releasing, by the terminal, the pre-configured transmission resource based on the counter exceeding a predetermined counter value.

In some embodiments, the method includes transmitting, by the terminal, an uplink data message using the pre-configured transmission resource at a pre-configured transmission resource time domain location included within the pre-configured transmission resource configuration, wherein the uplink data transmission is unsuccessful if the terminal does not receive a feedback message from the communication node.

In some embodiments, the method includes splitting, by the terminal, the counter into two counters if a number of uplink data transmission have not been used continuously with the preconfigured transmission resource.

In an embodiment, a method for wireless communication comprises transmitting, by a communication node, a pre-configured transmission resource to a terminal. The method also includes receiving, by the communication node, a failure message over the pre-configured transmission resource indicating an invalid timing advance (TA) or a failed uplink transmission. The method also includes transmitting, by the communication node, a control channel order including a random-access resource over a terminal-specific pre-configured transmission resource PDCCH search space to the terminal. The method also includes receiving, by the communication node, a terminal identified preamble on the random-access resource. The method also includes transmitting, by the communication node, a pre-configured transmission resource control channel scheduling message on the terminal-specific pre-configured transmission resource PDCCH search space, wherein the pre-configured transmission resource control channel scheduling message includes a TA update information or a grant for a TA update.

In some embodiments, the method includes determining, by the communication node, that the pre-configured transmission resource control channel scheduling message includes the grant for the TA update; and transmitting, by the communication node, a physical downlink shared channel (PDSCH) on the grant and includes a TA command medium access control (MAC) control element (CE) on the PDSCH.

In some embodiments, the method includes monitoring, by the terminal, a pre-configured transmission resource control channel monitoring duration, wherein the pre-configured transmission resource control channel monitoring duration starts upon transmitting a failure message over the pre-configured transmission resource indicating an invalid timing advance (TA) or a failed uplink transmission.

In some embodiments, the method includes determining, by the communication node, that the pre-configured transmission PDCCH search space monitoring duration did not expire; determining, by the communication node, that a pre-configured transmission resource dedicated radio network temporary identifier (RNTI) is valid, wherein the pre-configured transmission resource control channel scheduling message utilizes the terminal-specific pre-configured transmission resource PDCCH search space for dedicated scheduling based on determining that the pre-configured transmission resource control channel monitoring duration did not expire or determining that the pre-configured transmission resource RNTI is valid.

In some embodiments, the pre-configured transmission resource control channel scheduling message uses PDCCH common search space for random access (CSS-RA) to schedule a random-access response (RAR) based on determining that the pre-configured transmission resource control channel monitoring duration expired or determining that the pre-configured transmission resource RNTI is invalid.

In an embodiment, a method for wireless communication comprises receiving, by a terminal, a pre-configured transmission resource associated with a pre-configured transmission resource configuration. The method also includes transmitting, by the terminal, uplink information based on the pre-configured transmission resource to a communication node, wherein the uplink information includes a resource control state transition information.

In some embodiments, the resource control state transition information includes at least one of: a data PDU, a NAS PDU, a RRC message, a power headroom report (PHR) medium access control (MAC) control element (CE), a data volume and power headroom report (DPR) MAC CE, an extended DPR (eDPR) MAC CE, and a terminal speed indication.

In some embodiments, the method includes receiving, by the terminal, a message to switch the terminal to a connected state based on the resource control state transition information.

In some embodiments, the resource control state transition information includes a buffer status report (BSR) medium access control (MAC) control element (CE) with a buffer size greater than zero, where the RRC state transition information indicates the communication node to switch to a connected state.

In some embodiments, the method includes monitoring, by the terminal, a physical downlink control channel according to a PDCCH common search space for paging (CSS-paging) based on receiving the message from the communication node.

In an embodiment, a method for wireless communication comprises receiving, by a terminal, a pre-configured transmission resource from a first communication node. The method also includes reselecting, by the terminal, a second communication node based a terminal mobility of the terminal. The method also includes transmitting, by the terminal, a pre-configured transmission resource release request to the second communication node, wherein the pre-configured transmission resource release request includes a communication node identifier identifying the first communication node and a terminal identifier identifying the terminal.

In some embodiments, the method includes starting, by the terminal, a pre-configured transmission resource release timer upon reselecting the second communication node; initiating, by the terminal, a pre-configured transmission resource release process based on determining that the pre-configured transmission resource release timer expiring and determining that the pre-configured transmission resource is not released.

In some embodiments, the second communication node is configured to transmit a message to release the pre-configured transmission resource that includes the terminal identifier to the first communication node based on the second communication node receiving the pre-configured transmission resource release request from the terminal, and wherein the message to release the pre-configured transmission resource is transmitted by one of a S1 interface and a X2 interface.

In some embodiments, the first communication node is configured to transmit a pre-configured transmission resource release response to the second communication node by one of the S1 interface and the X2 interface.

In some embodiments, the second communication node is configured to transmit a pre-configured transmission resource release response to the terminal via the X2 interface, wherein the first communication node is configured to transmit a pre-configured transmission resource release notification to a core network node upon receiving the message to release the pre-configured transmission resource from the second communication node.

In some embodiments, the second communication node is configured to transmit a pre-configured transmission resource release notification to a core network node indicating a release of the pre-configured transmission resource from the first communication node.

Figure 12:
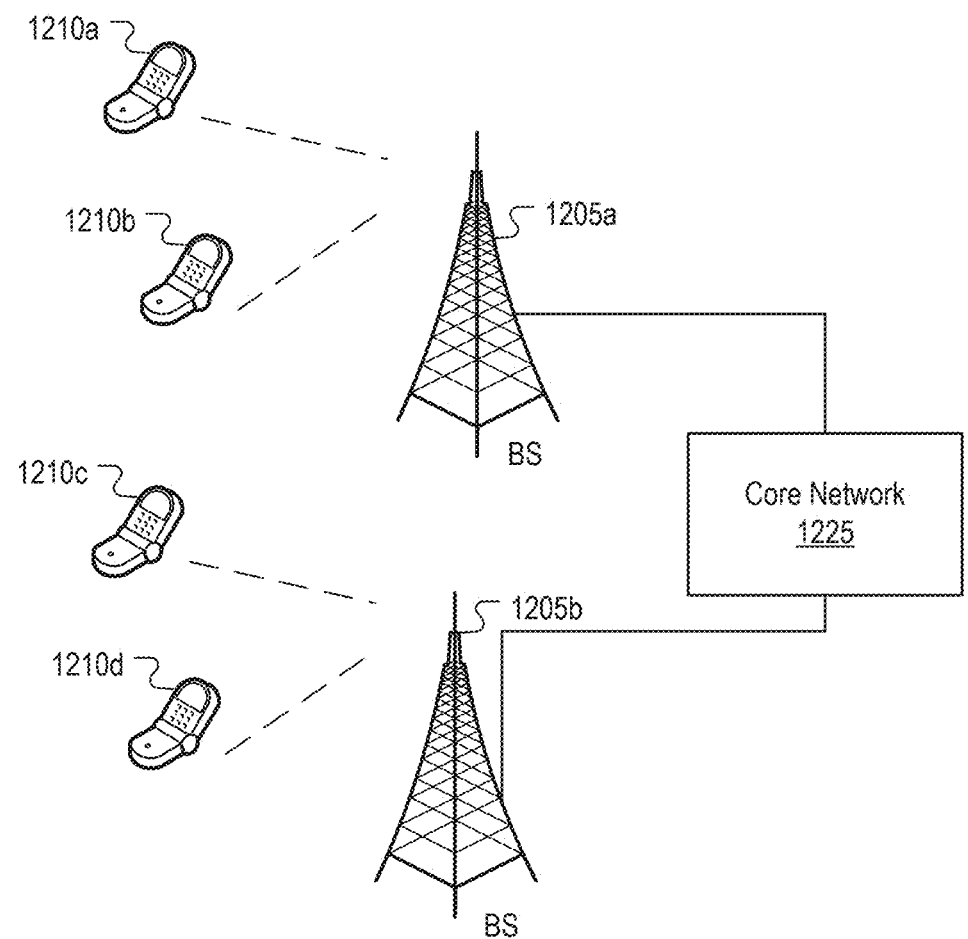
FIG. 12 shows an example of a wireless communication system where techniques in accordance with one or more embodiments of the present technology can be applied.

FIG. 12 shows an example of a wireless communication system where techniques in accordance with one or more embodiments of the present technology can be applied. A wireless communication system 1200 can include one or more base stations (BSs) 1205a, 1205b, one or more wireless devices 1210a, 1210b, 1210c, 1210d, and a core network 1225. A base station 1205a, 1205b can provide wireless service to wireless devices 1210a, 1210b, 1210c and 1210d in one or more wireless sectors. In some implementations, a base station 1205a, 1205b includes directional antennas to produce two or more directional beams to provide wireless coverage in different sectors.

The core network 1225 can communicate with one or more base stations 1205a, 1205b. The core network 1225 provides connectivity with other wireless communication systems and wired communication systems. The core network may include one or more service subscription databases to store information related to the subscribed wireless devices 1210a, 1210b, 1210c, and 1210d. A first base station 1205a can provide wireless service based on a first radio access technology, whereas a second base station 1205b can provide wireless service based on a second radio access technology. The base stations 1205a and 1205b may be co-located or may be separately installed in the field according to the deployment scenario. The wireless devices 1210a, 1210b, 1210c, and 1210d can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 13:
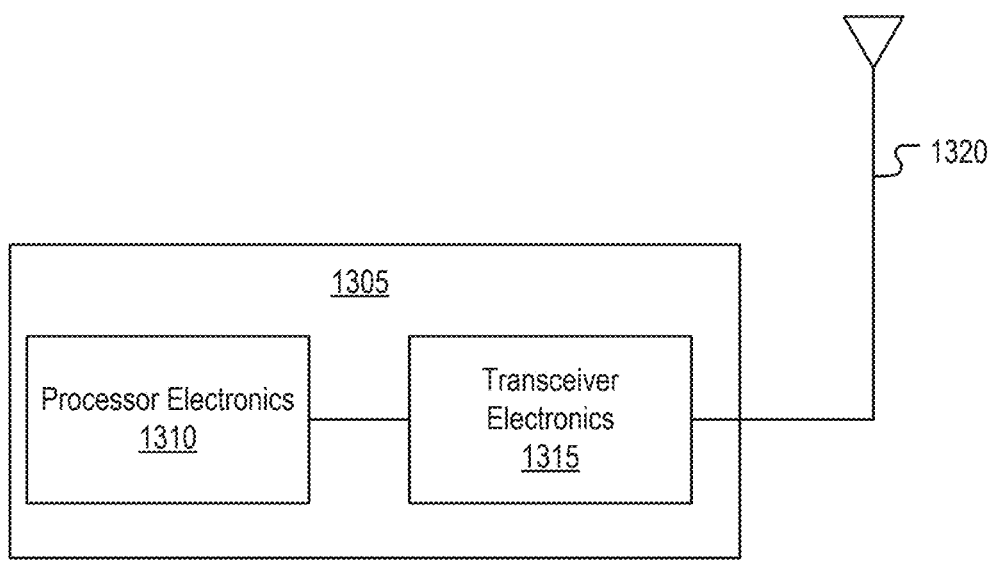
FIG. 13 is a block diagram representation of a portion of a hardware platform.

FIG. 13 is a block diagram representation of a portion of a hardware platform. A hardware platform 1305 such as a network device or a base station or a wireless device (or UE) can include processor electronics 1310 such as a microprocessor that implements one or more of the techniques presented in this document. The hardware platform 1305 can include transceiver electronics 1315 to send and/or receive wired or wireless signals over one or more communication interfaces such as antenna 1320 or a wireline interface. The hardware platform 1305 can implement other communication interfaces with defined protocols for transmitting and receiving data. The hardware platform 1305 can include one or more memories (not explicitly shown) configured to store information such as data and/or instructions. In some implementations, the processor electronics 1310 can include at least a portion of the transceiver electronics 1315. In some embodiments, at least some of the disclosed techniques, modules or functions are implemented using the hardware platform 1305.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
receiving, by a terminal, a first message including a pre-configured transmission resource configuration from a communication node, the first message further including a pre-configured transmission resource release instance including a counter configured to count a number of continuous inactivity of a pre-configured transmission resource associated with the pre-configured transmission resource configuration;
determining, by the terminal, that a timing advance (TA) is valid based on a Reference Signal Received Power (RSRP) change threshold and a TA validity timer; and
transmitting, by the terminal, a second message using a pre-configured transmission resource associated with the pre-configured transmission resource configuration based on the determining that the TA is valid, and
wherein the determining is further based on an RSRP change and the determining comprises:
setting an RSRP of a serving cell as a reference RSRP, in response to receiving, by the terminal, at least one of the pre-configured transmission resource configuration and a TA update indication; and
determining the RSRP change based on a difference between a measured RSRP value of the serving cell and the reference RSRP, and
wherein the method further comprises:
making, by the terminal, a comparison between the number of continuous inactivity of the pre-configured transmission resource and the pre-configured transmission resource release instance; and
releasing, by the terminal, the pre-configured transmission resource based on the comparison.

2. The method of claim 1, wherein the determining determines that the TA is valid due to determining that (1) the RSRP change threshold and the TA validity timer are included within the pre-configured transmission resource configuration message, (2) the TA validity timer has not expired, and (3) the RSRP change does not exceed the RSRP change threshold.

3. The method of claim 1, wherein the second message corresponds to a physical uplink shared channel message on the pre-configured transmission resources and transmitted to the communication node.

4. The method of claim 1, wherein the determining determines that the TA is valid based on another determination that the TA validity timer and the RSRP change threshold are not included within the pre-configured transmission resource configuration.

5. The method of claim 1, wherein the determining determines that the TA is valid due to determining that (1) the TA validity timer is not included within the pre-configured transmission resource configuration and the RSRP change threshold is included within the pre-configured transmission resource configuration, and (2) the RSRP change does not exceed the RSRP change threshold.

6. The method of claim 1, wherein the determining determines that the TA is invalid due to determining that (1) the TA validity timer is included within the pre-configured transmission resource configuration and that the RSRP change threshold is not included within the pre-configured transmission resource configuration, and (2) the TA validity timer expired.

7. The method of claim 1, wherein the determining determines that the TA is valid due to determining that (1) the TA validity timer is included within the pre-configured transmission resource configuration and the RSRP change threshold is not included within the pre-configured transmission resource configuration, and (2) the TA validity timer has not expired.

8. The method of claim 1, wherein the determining determines that the TA is invalid due to determining that (1) the RSRP change threshold and the TA validity timer are included within the pre-configured transmission resource configuration message and (2) the TA validity timer has expired or (2) the RSRP change exceeds the RSRP change threshold.

9. The method of claim 1, wherein the counter is incremented based on an unsuccessful delivery of an uplink data message by the terminal using the pre-configured transmission resource at a pre-configured transmission resource time domain location included within the pre-configured transmission resource configuration.

10. The method of claim 1, further comprising:
resetting, by the terminal, the counter based on successfully transmitting an uplink data message using the pre-configured transmission resource at a pre-configured transmission resource time domain location included within the pre-configured transmission resource configuration.

11. An apparatus for wireless communication comprising a processor that is configured to carry out a method comprising:
receiving a first message including a pre-configured transmission resource configuration from a communication node, the first message further including a pre-configured transmission resource release instance including a counter configured to count a number of continuous inactivity of a pre-configured transmission resource associated with the pre-configured transmission resource configuration;
determining that a timing advance (TA) is valid based on a Reference Signal Received Power (RSRP) change threshold and a TA validity timer; and
transmitting a second message using a pre-configured transmission resource associated with the pre-configured transmission resource configuration based on the determining that the TA is valid, and
wherein the determining is further based on an RSRP change and the determining comprises:
setting an RSRP of a serving cell as a reference RSRP, in response to receiving, by the apparatus, at least one of the pre-configured transmission resource configuration and a TA update indication; and
determining the RSRP change based on a difference between a measured RSRP value of the serving cell and the reference RSRP, and
wherein the method further comprises:
making a comparison between the number of continuous inactivity of the pre-configured transmission resource and the pre-configured transmission resource release instance; and
releasing the pre-configured transmission resource based on the comparison.

12. The apparatus of claim 11, wherein the determining determines that the TA is valid based on another determination that the TA validity timer and the RSRP change threshold are not included within the pre-configured transmission resource configuration.

13. The apparatus of claim 11, wherein the determining determines that the TA is valid due to determining that (1) the TA validity timer is not included within the pre-configured transmission resource configuration and the RSRP change threshold is included within the pre-configured transmission resource configuration, and (2) the RSRP change does not exceed the RSRP change threshold.

14. The apparatus of claim 11, wherein the determining determines that the TA is valid due to determining that (1) the TA validity timer is included within the pre-configured transmission resource configuration and the RSRP change threshold is not included within the pre-configured transmission resource configuration, and (2) the TA validity timer has not expired.

15. The apparatus of claim 11, wherein the first message further includes a pre-configured transmission resource release instance; and
   wherein the method further includes making a comparison between a number of continuous inactivity of the pre-configured transmission resource associated with the pre-configured transmission resource configuration and the pre-configured transmission resource release instance.

16. The apparatus of claim 11, wherein the determining determines that the TA is valid due to determining that (1) the RSRP change threshold and the TA validity timer are included within the pre-configured transmission resource configuration message, (2) the TA validity timer has not expired, and (3) the RSRP change does not exceed the RSRP change threshold.

* * * * *